(12) United States Patent
Conklin et al.

(10) Patent No.: US 10,648,615 B1
(45) Date of Patent: May 12, 2020

(54) MOUNTING SYSTEM FOR WIRELESS AND SENSING DEVICES

(71) Applicants: Rick Conklin, Bellefonte, PA (US); Scott Thompson, State College, PA (US)

(72) Inventors: Rick Conklin, Bellefonte, PA (US); Scott Thompson, State College, PA (US)

(73) Assignee: Chatsworth Products Inc, Agoura Hills, CA (US)

( * ) Notice: Subject to any disclaimer, the term of this patent is extended or adjusted under 35 U.S.C. 154(b) by 0 days.

(21) Appl. No.: 16/107,011

(22) Filed: Aug. 21, 2018

Related U.S. Application Data

(60) Provisional application No. 62/581,095, filed on Nov. 3, 2017.

(51) Int. Cl.
*F16M 13/00* (2006.01)
*F16M 13/02* (2006.01)

(52) U.S. Cl.
CPC .................... *F16M 13/027* (2013.01)

(58) Field of Classification Search
CPC ........... F16M 13/027; F21S 8/02; F21S 8/026
See application file for complete search history.

(56) References Cited

U.S. PATENT DOCUMENTS

| | | | | |
|---|---|---|---|---|
| 6,082,878 | A * | 7/2000 | Doubek | F21S 8/026 211/26 |
| 6,431,723 | B1 * | 8/2002 | Schubert | F21S 8/02 362/147 |
| 7,909,487 | B1 * | 3/2011 | Venetucci | F21S 8/02 362/147 |
| 10,378,738 | B1 * | 8/2019 | Davis | F21V 21/041 |
| 2019/0254139 | A1 * | 8/2019 | Van Winkle | F21S 8/026 |

* cited by examiner

*Primary Examiner* — Amy J. Sterling
(74) *Attorney, Agent, or Firm* — John J. Elnitski, Jr.

(57) ABSTRACT

A device mounting system used for wireless and sensing devices. The device mounting system includes a device bracket adapted to receive a device by attachment of the device to the device receiver bracket. The device mounting system includes a housing assembly to receive and support said device receiver bracket. The device mounting system includes a mounting interface to act as an interface to attach said device bracket to said housing assembly.

19 Claims, 23 Drawing Sheets

MOUNTING SYSTEM FOR WIRELESS AND SENSING DEVICES

This application claims the benefit of and incorporates by reference U.S. Provisional Application No. 62/581,095 filed Nov. 3, 2017.

BACKGROUND

The present invention generally relates to mounts for wireless devices and sensors. More specifically, the present invention relates to ceiling or wall mounts to provide mounting a device so the device largely flush with the ceiling or mount to wall surface to aesthetically enhance the appearance of the installation of the device.

Wireless networks have become very popular for computer networking in schools, hospitals, factories, public buildings and office buildings. A main part of a wireless networks is an access point. The access point is the unit which communicates wirelessly with mobile devices carried by users. The access point is generally connected to the main network with a data cable and is powered by an external power supply plugged into the access point. Access points are usually mounted in the ceilings of buildings to improve their wireless coverage. Ceilings are used as a way to partially conceal the appearance of the access point and the cables required to interconnect the access point with the network and power. The access point is an expensive piece of equipment which can be easily stolen from the ceiling of a building. Access points can be a variety of shapes and sizes, depending on the manufacturer of the access point. The different shapes and sizes present a problem to universally secure an access point in the ceiling. It is desirable to conveniently mount the access point in the ceiling to conceal much of the access point and connected cables and gives it an overall appearance which is architecturally acceptable.

Likewise, multimedia gateways, such as an Apple TV, are connected to multimedia projectors in classrooms and conference rooms. Ideally the multimedia gateway is mounted physically close to the projector to shorten the cable connected the two. Since the projector is often mounted in the ceiling it is desirable to have the multimedia gateway mounted in the ceiling. This is problematic, as the multimedia gateways are typically not plenum rated to be mounted in or above the ceiling. There is commonly an absence of a convenient means to attach the multimedia gateway to anything structurally. Finally, the multimedia gateway may have a wireless network connection and require an infrared signal to control the operation of the gateway. So the gateway cannot be fully enclosed in metal, but rather must have an opening, so that the gateway can be connected wireless and controlled by IR signals. Other electronic devices may be mounted in the ceiling, including wireless access gear for building automation and asset tracking, real time location systems, ultrasonic transducer, distributed antenna system (DAS) antennas and remote access units, wireless monitoring equipment, video cameras, multimedia projectors, air quality sensors, particle counters, differential pressures sensors, and light and sound sensors It is an object of the present invention to provide device mounting system for mounting of wireless and sensing devices.

SUMMARY OF THE INVENTION

A device mounting system used for wireless and sensing devices. The device mounting system includes a device bracket adapted to receive a device by attachment of the device to the device receiver bracket. The device mounting system includes a housing assembly to receive and support said device receiver bracket. The device mounting system includes a mounting interface to act as an interface to attach said device bracket to said housing assembly.

DETAILED DESCRIPTION

The present invention includes different embodiments of a device mounting system for wireless and sensing devices, as shown in FIGS. 1-23. All of the embodiments employ a device bracket for attachment of the device; some type of housing assembly to receive and support the device bracket and a mounting interface which interfaces the assembly of the device bracket and the housing assembly. FIGS. 1-6 show a first embodiment of the device mounting system, which includes a device mount and ceiling receiver. FIGS.

Figure 1:
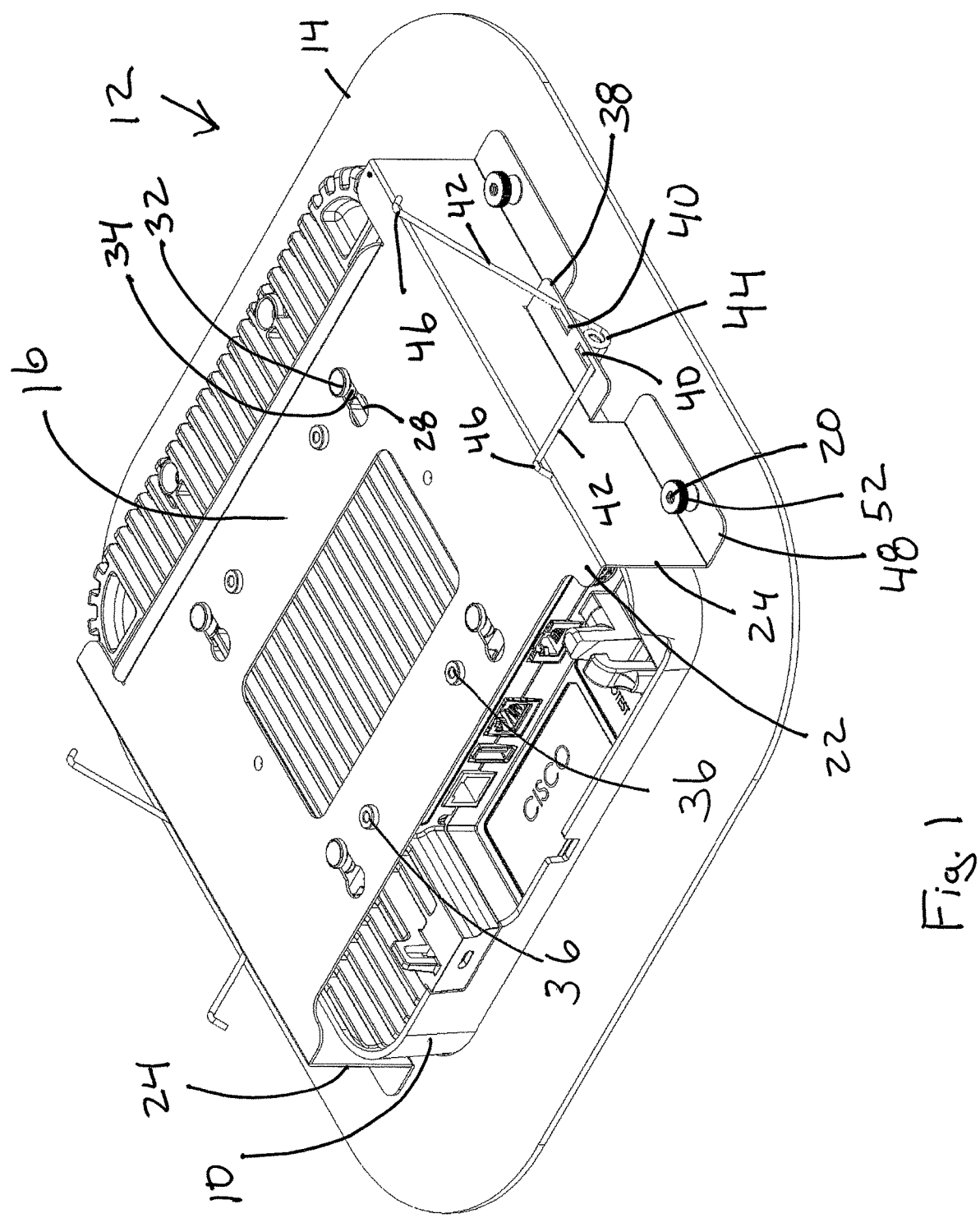
FIG. 1 is a perspective view of a device and device mount according to the present invention.
Figure 2:
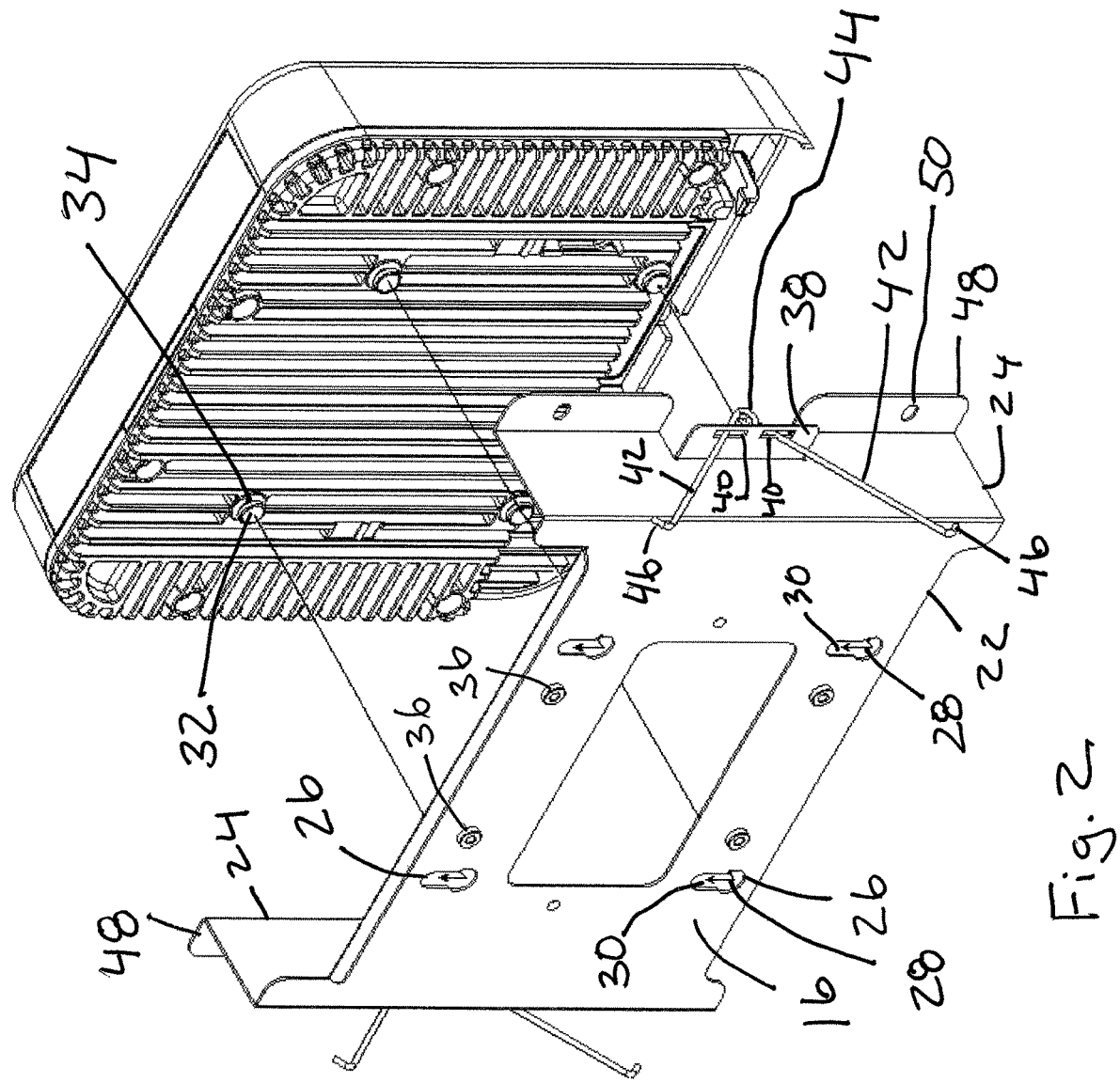
FIG. 2 is a perspective exploded view of a device and device mount according to the present invention.
Figure 3:
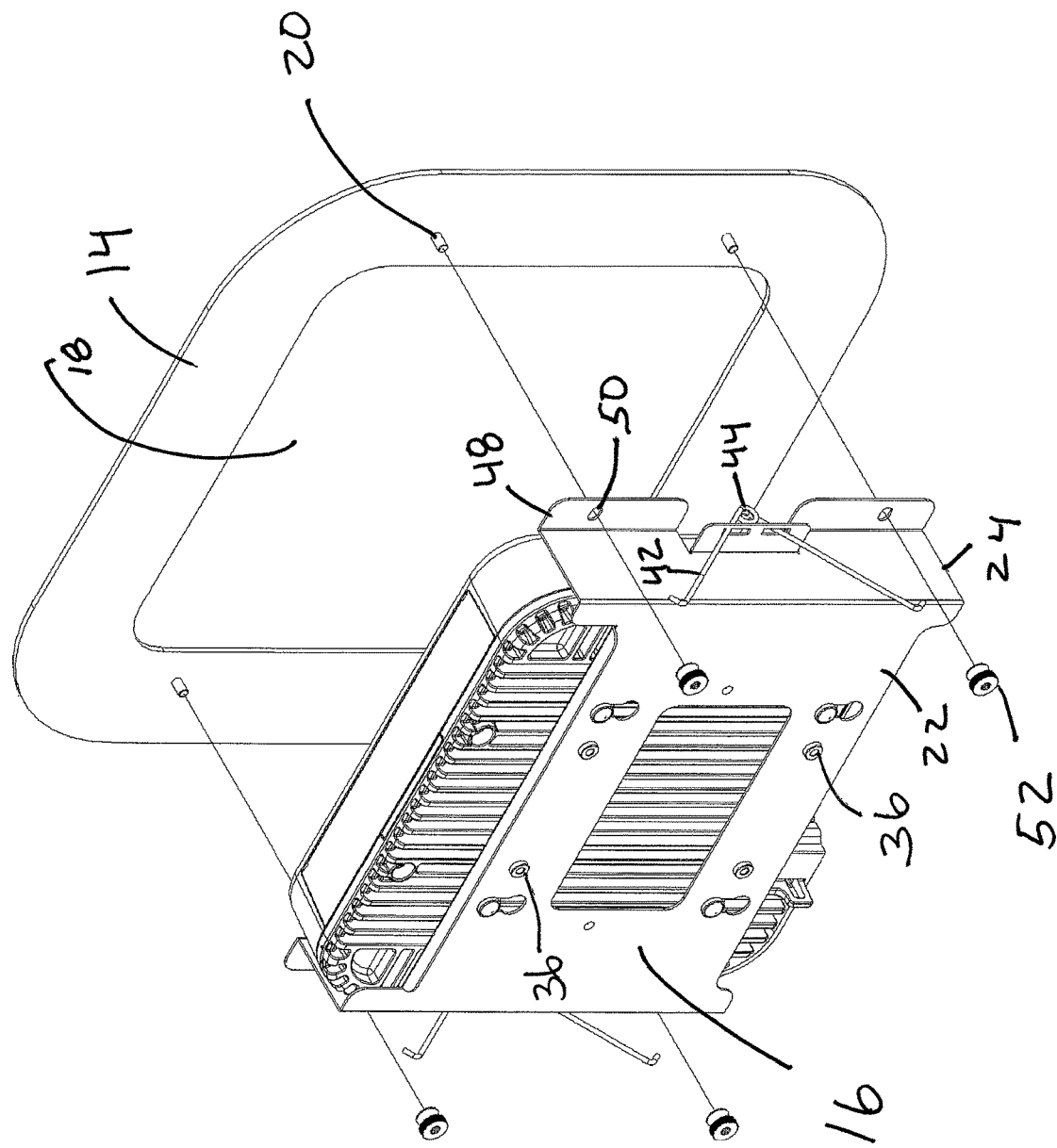
FIG. 3 is a perspective exploded view of a device and device mount according to the present invention.

1-3 show the device 10 mounted to a device mount 12. FIG. 1 shows an assembled view and FIGS. 2-3 exploded views of the device 10 and the device mount 12. The device mount 12 includes a trim ring 14 and device bracket 16. The trim ring 14 includes a device opening 18 and studs 20 projecting out from the back of the trim ring 14. The device bracket 16 is shown as mounting plate 22 with two support flanges 24. The support flanges 24 are used to elevate the mounting plate 22 above the rear side of the trim ring 14 and over the device opening 18. The mounting plate 22 includes key slots 26 having a fastener opening 28 leading to a slot 30. The key slots 26 accept a button 32 and post 34 combination extending from the device 10. The fastener opening 28 and the buttons 32 are shown as a round shape, but could be other shapes that match. The buttons 32 fit into and beyond the fastener opening 28 that acts as a button entrance and the posts 34 slide along the slots 30 to secure the device 10 to the device bracket 16. A bottom surface of the button 32 prevents the device 10 from separating from the device bracket 12, when the post 34 is moved along the slot 30 and away from the fastener opening 28. Also shown are mounting holes 36 that can be threaded for mounting a device that does not have the button 32 and post 34 combination. The device bracket 16 includes two spring flanges 38 extending from the support flanges 24 that are part of the mounting interface. The spring flanges 38 each include two spring slots 40 to receive spring legs 42 of a spring 44, where the spring is shown as a coil. Each spring leg 42 incudes a spring stop 46, which is an end of the spring leg 42 that is bent over. The device bracket 16 also includes trim flanges 48 extending from the support flanges 24. The trim flanges 48 include stud holes 50 that align with the studs 20 of the trim ring 14. Once the device 10 is secured in the device bracket 16, the device bracket 16 mounts to the trim ring 14 by placing the stud holes 50 of the trim flanges 48 over the studs 20 of the trim ring 14. During mounting of the device bracket 16 to the trim ring 14, the top of device 10 is placed into the device opening 18 of the trim ring 14 and the threaded nuts 52 are used to secure the device bracket 16 to the trim ring 14. It is envisioned that other fastener than threaded nuts 52 can be employed, such as snap on fasteners or a fastener that captures the studs.

Figure 4:
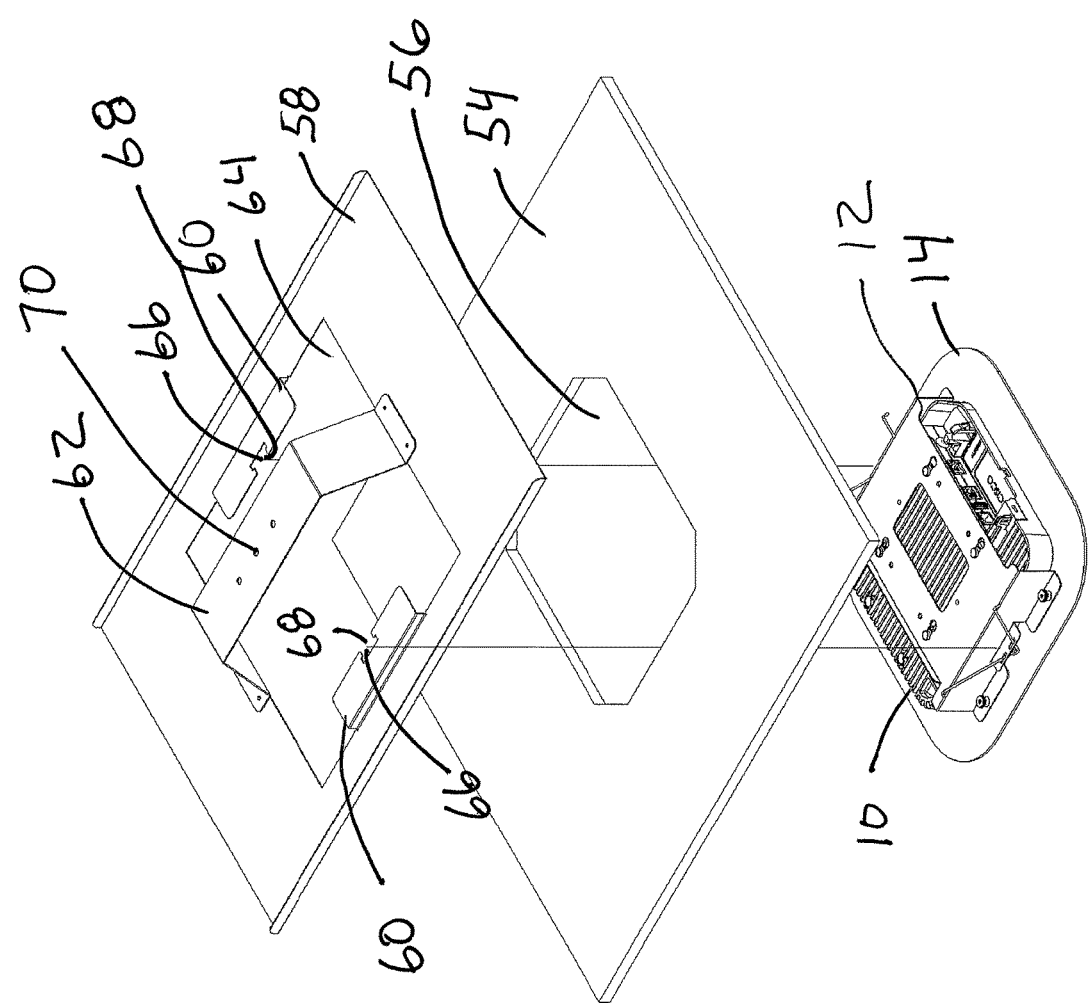
FIG. 4 is a perspective view of a device, device mount and ceiling receiver according to the present invention.
Figure 5:
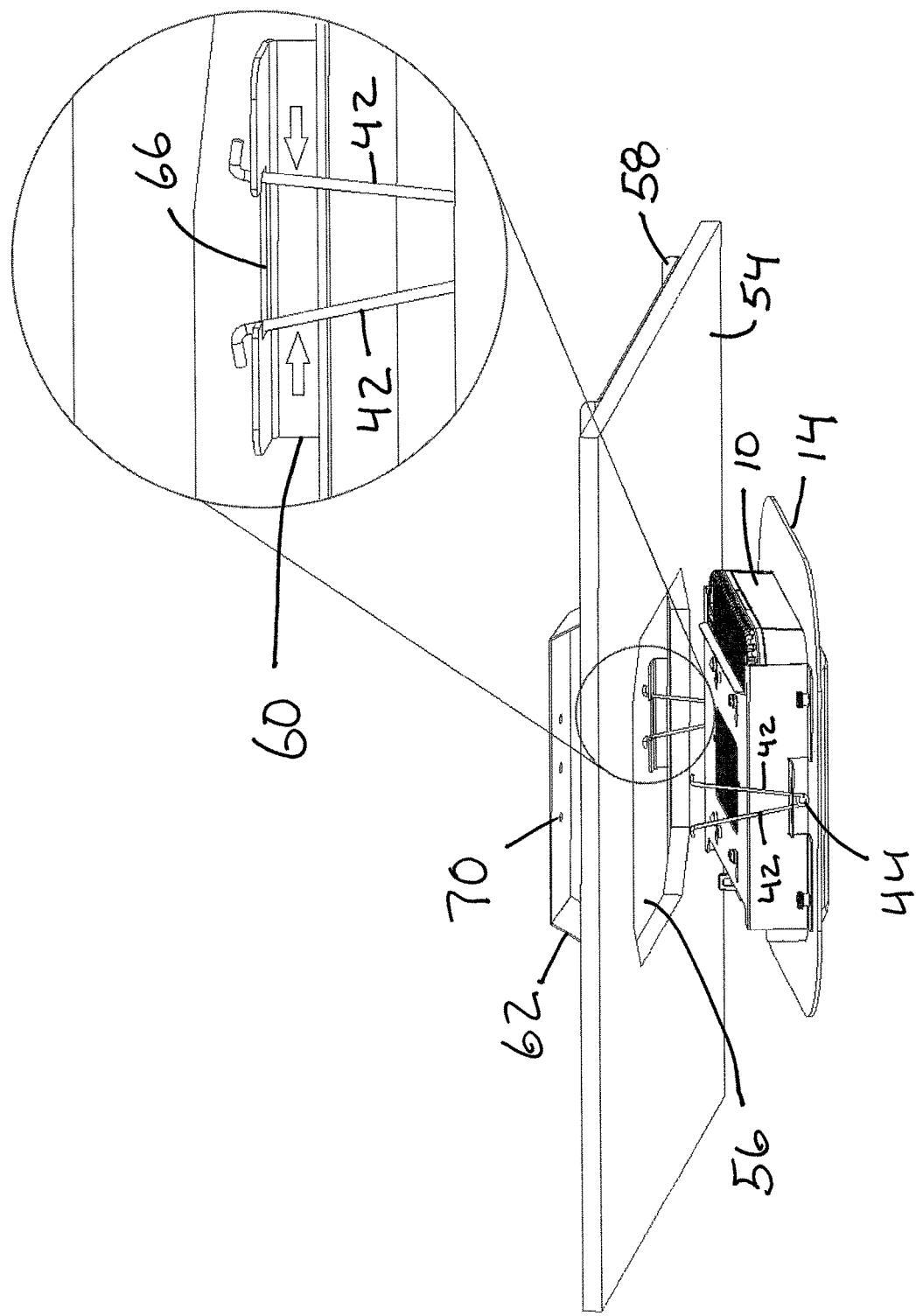
FIG. 5 is a perspective view of a device, device mount and ceiling receiver according to the present invention.
Figure 6:
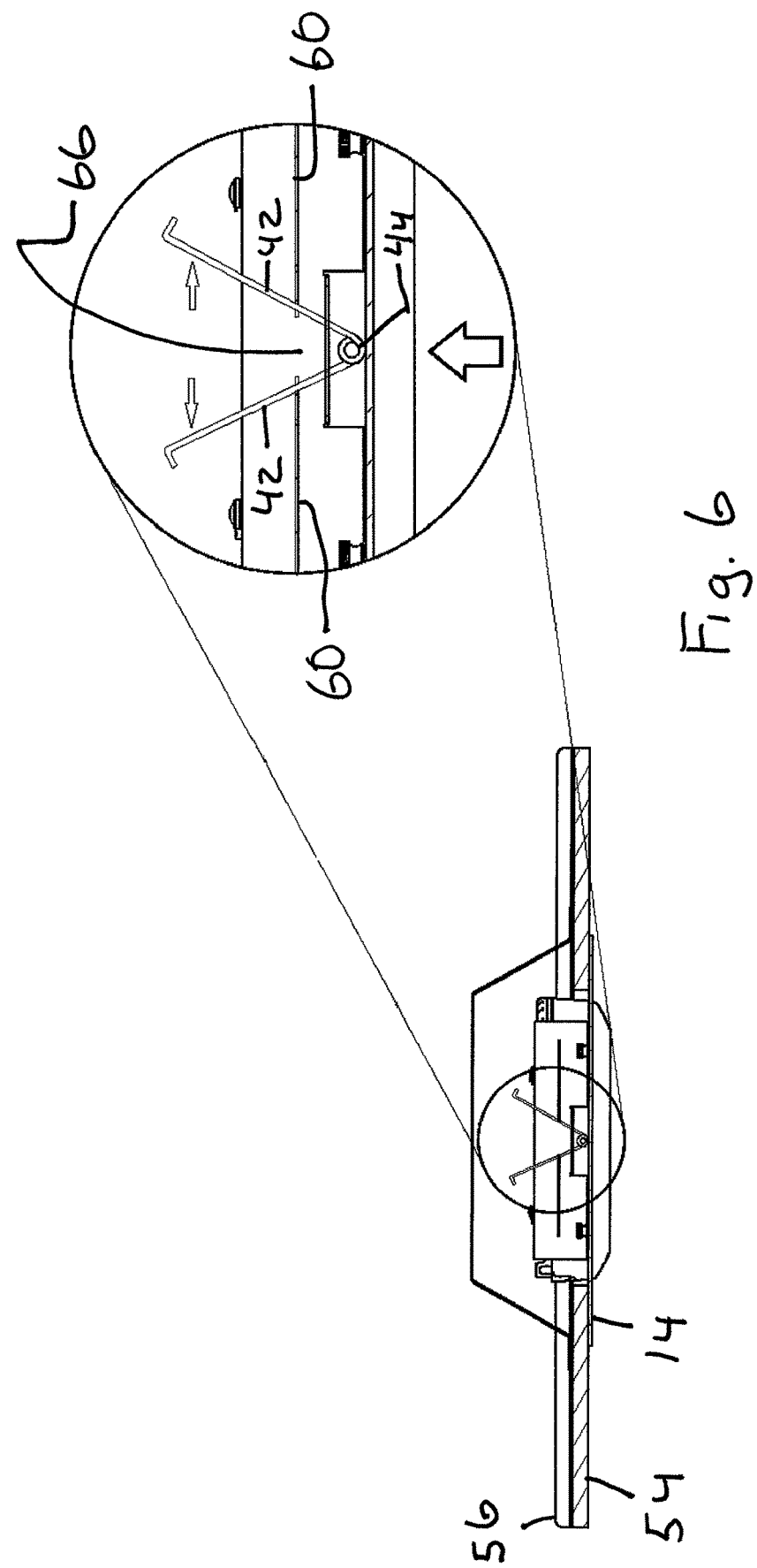
FIG. 6 is a sectional view of a device, device mount and ceiling receiver according to the present invention.

FIGS. 4-6 show the mounting of the device 10 in the ceiling receiver. The ceiling receiver is part of the housing assembly that includes a ceiling port 54 and device mount receiver. The ceiling port 54 is part of a ceiling and includes a device opening 56. The ceiling port 54 can be a ceiling tile or something as simple as a solid ceiling with the device opening 56. The device mount receiver includes a base 58, two spring lock flanges 60 and ceiling bracket 62, where the spring lock flanges 60 are part of the mounting interface. The base 58 is wider than the device opening 56 of the ceiling port 54 so that the base 58 lies against the inside surface of the ceiling port 54 to provide support and weight distribution about the device opening 56. The base 58 includes a device opening 64 to allow the device bracket 12 with the device 10 to pass into the ceiling port 54. The spring lock flanges 60 extend from the base 58 and each includes a spring lock slot 66. The spring lock slot 66 includes an entrance opening 68. The ceiling bracket 62 extends from the base 58 and includes mounting holes 70 for further securing the ceiling receiver in a ceiling. FIG. 4 shows the device 10 and device mount 12 to be mounted in the ceiling receiver. FIG. 5 shows the spring legs 42 of each spring 44 are compressed to allow the spring legs 42 to be installed in the spring lock slot 66 of the spring lock flange 60 by way of the entrance opening 68. Once the spring legs 42 are installed and allowed to expand, the spring stops 46 prevent the device 10 and device mount 12 from falling from the ceiling receiver. FIG. 6 shows the device 10 and device mount 12 pushed up against the outside surface of the ceiling port 54 so the trim ring 14 is flush up against the ceiling. The spring legs 42 compress in the spring lock slots 66 as the assembled device 10 and device mount 12 are pushed up in the device opening 56 of the ceiling port 54. The tension in the spring 44 forces the spring legs 42 away from each other and against the spring lock slots 66. This tension along with frictional forces retains the assembled device 10 and device 12 mount against the ceiling port 54.

Figure 7:
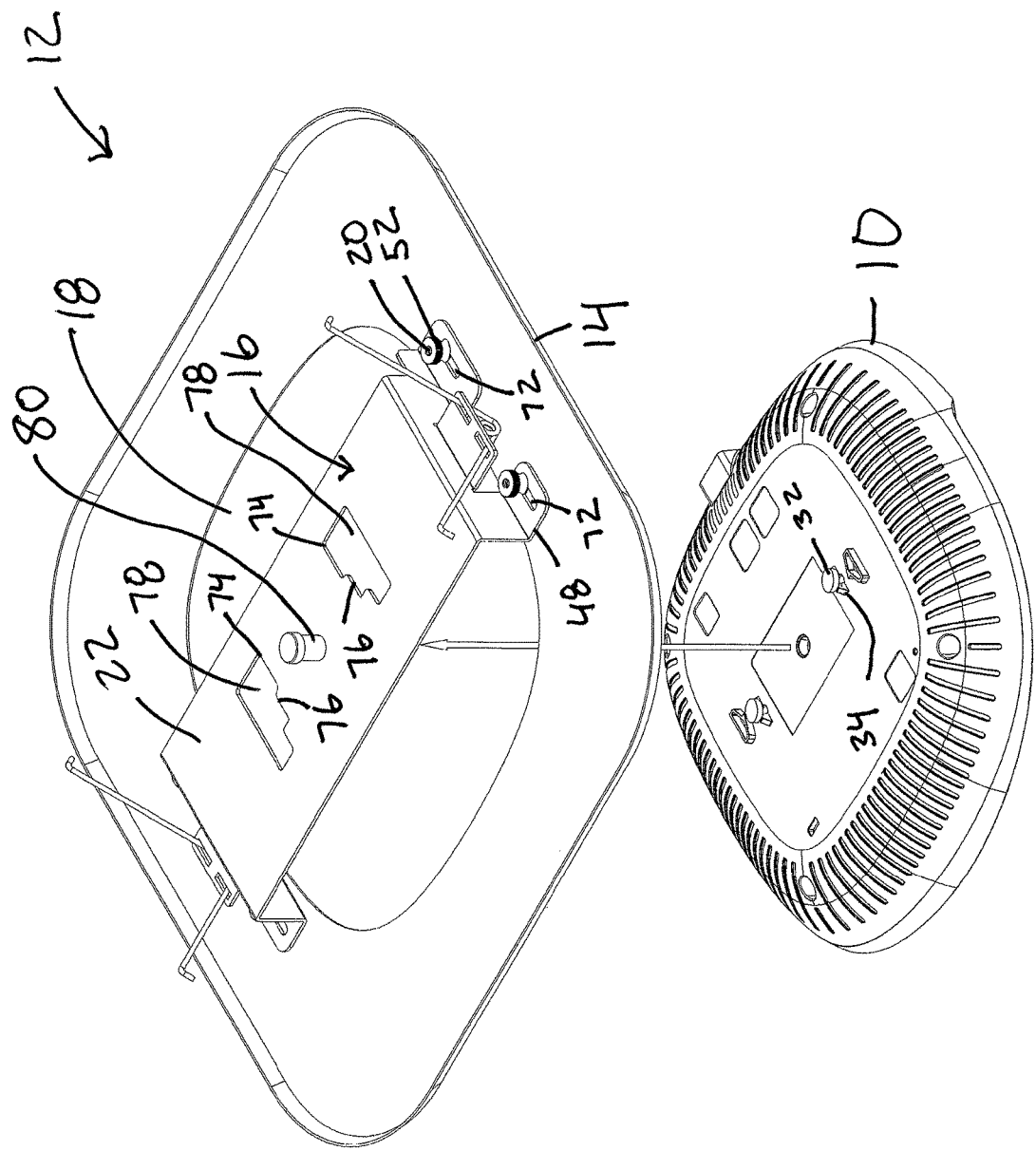
FIG. 7 is a perspective view of a device and device mount according to the present invention.
Figure 8:
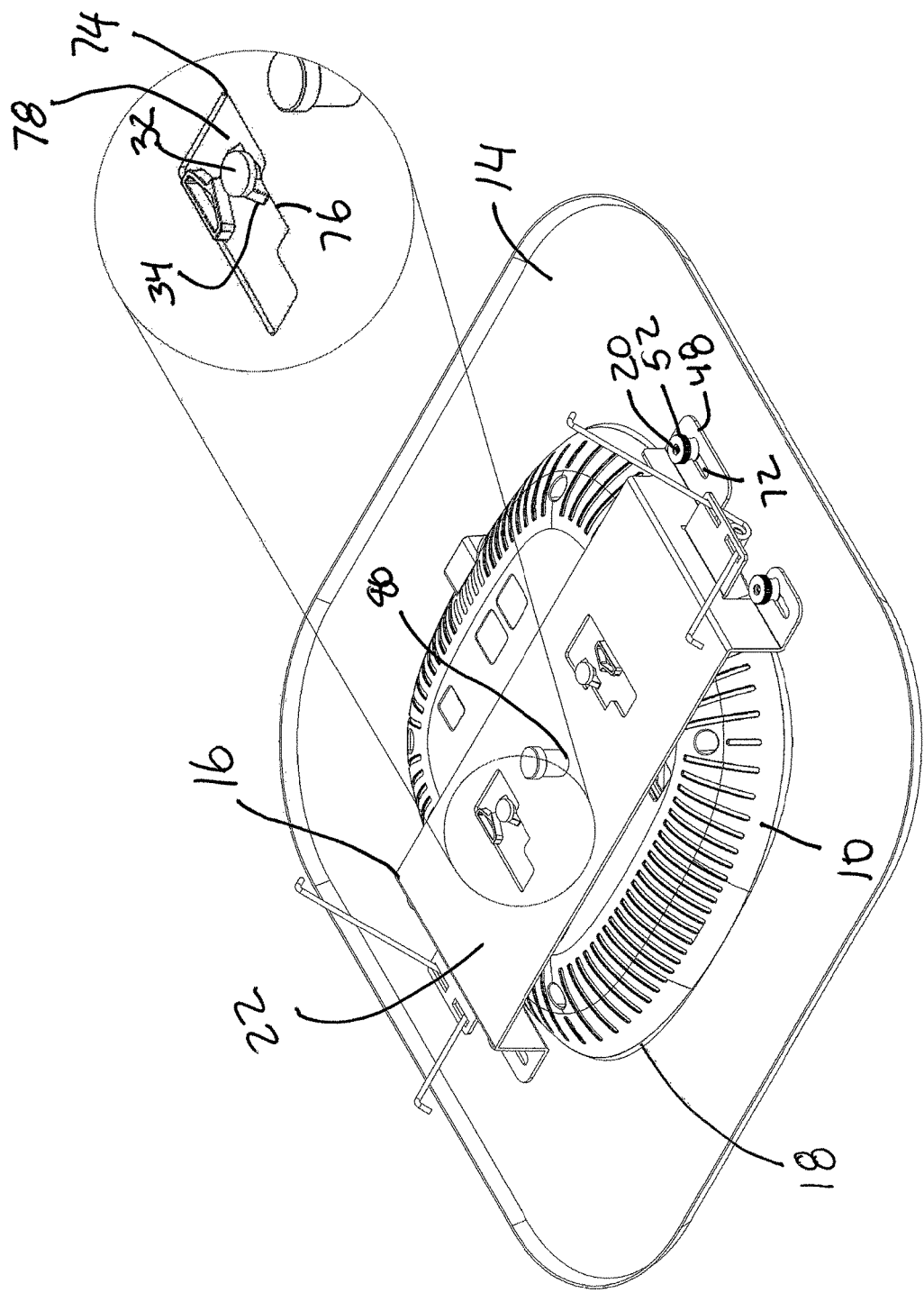
FIG. 8 is a perspective view of a device and device mount according to the present invention.
Figure 9:
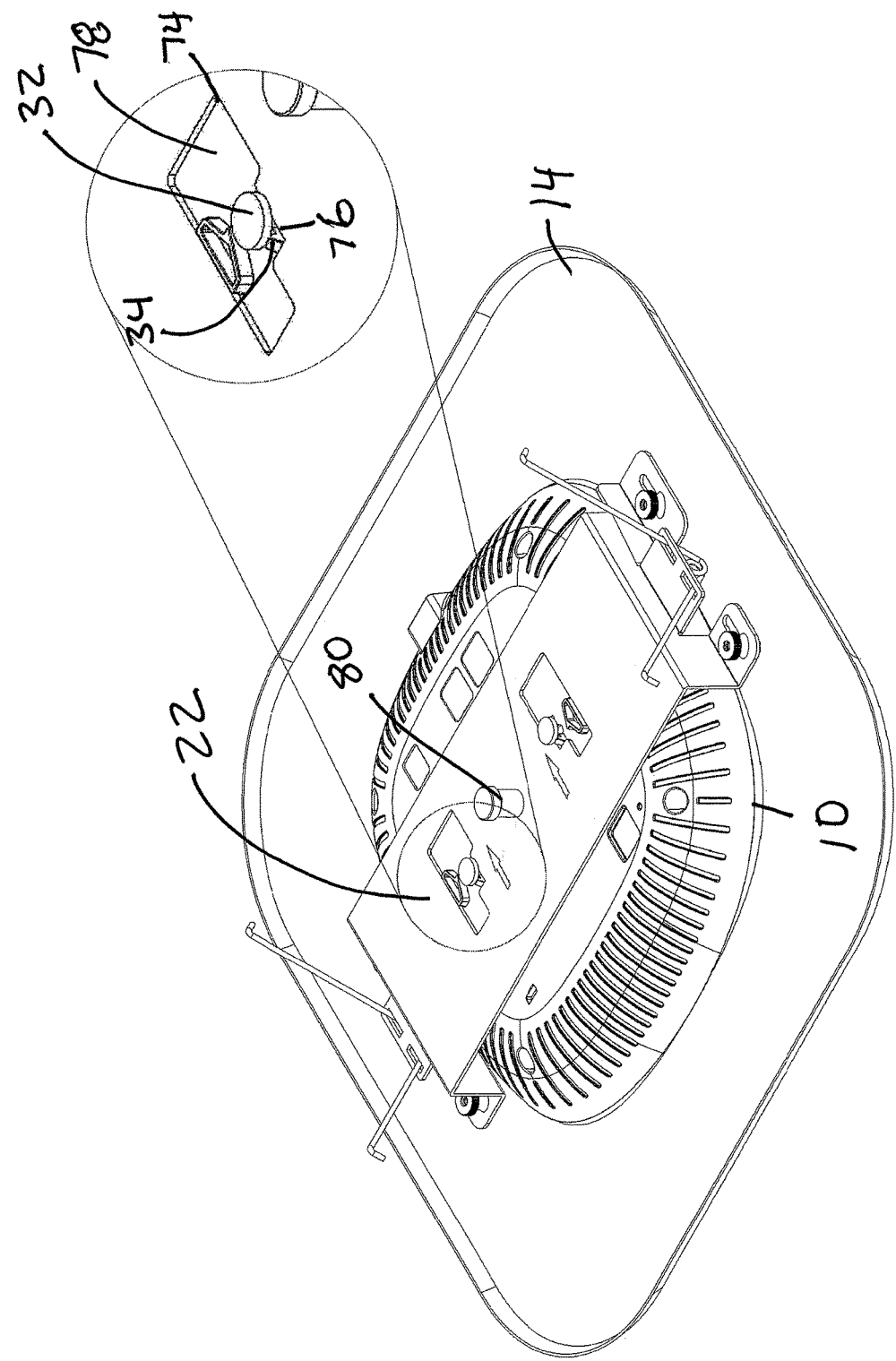
FIG. 9 is a perspective view of a device and device mount according to the present invention.
Figure 10:
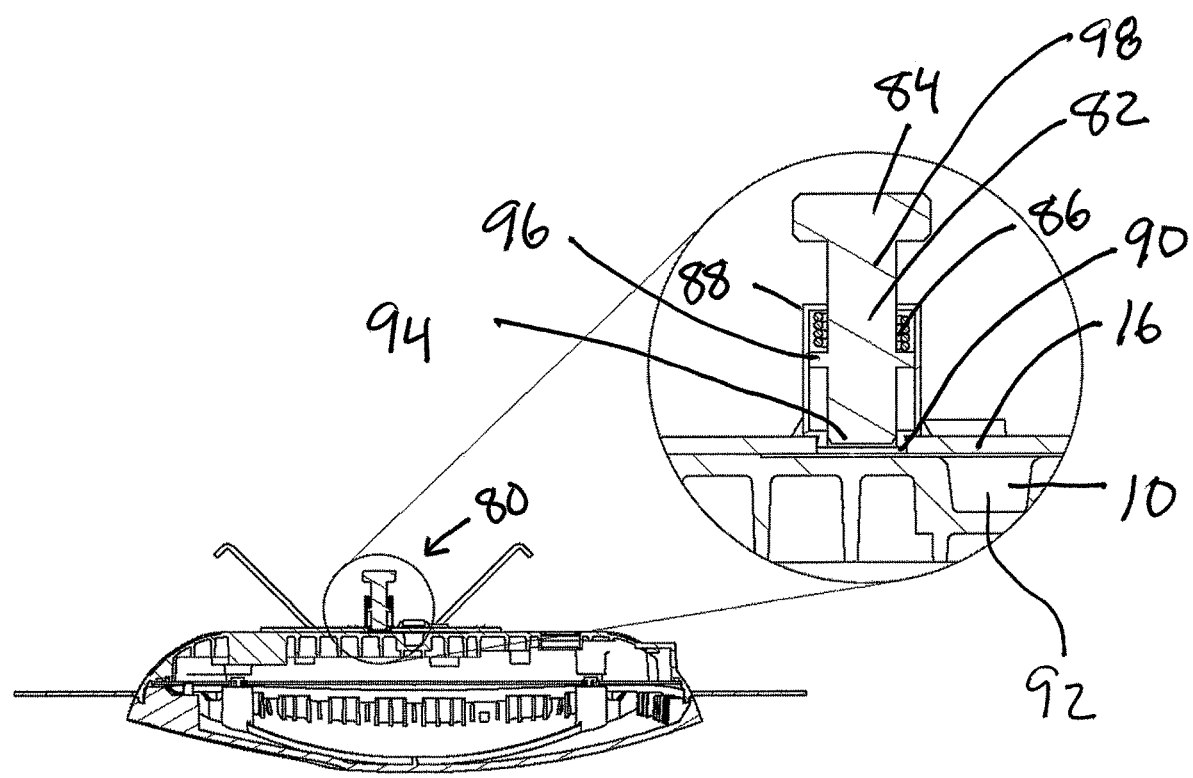
FIG. 10 is a sectional view a device, device mount, ceiling receiver according to the present invention.
Figure 11:
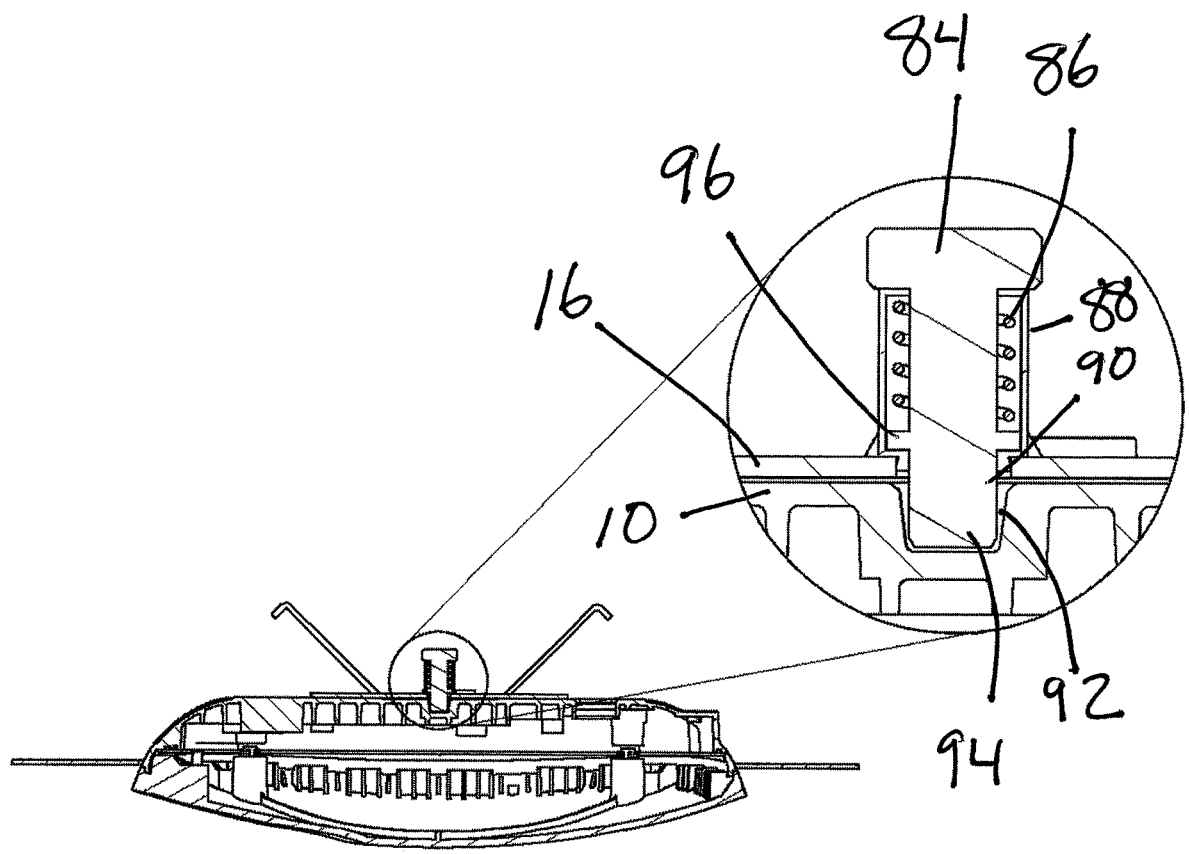
FIG. 11 is a sectional view a device, device mount, ceiling receiver according to the present invention.

FIGS. 7-11 show another embodiment of the device mounting system, which includes a device mount 12 and ceiling receiver. FIGS. 7-11 show the device 10 mounted in a device mount 12 similar to FIGS. 1-3. FIG. 7 shows an exploded view of the device 10 and the device mount 12. The device mount includes a trim ring 14 and device bracket 16. The trim ring 14 includes studs 20 projecting out from the back of the trim ring 14 as was used in FIGS. 2-3, that are shown covered by threaded nuts 52. The device bracket 16 of FIGS. 7-11 is different than the device bracket 16 in FIGS. 2-3. The trim flanges 48 include stud slots 72 instead of stud holes 50 that align and are mounted over the studs 20 of the trim ring 14 prior to mounting of the device 10 to the device bracket 16. The stud slots 72 permit the device bracket 16 to move across the trim ring 14 as required for device attachment, until the threaded nuts 52 are tightened to fix the device bracket 16 on the trim ring 14. It is envisioned that other fasteners than threaded nuts 52 can be employed, such as snap fasteners or a fastener that captures the studs. The device bracket 16 includes two button slots 74 in the mounting plate 22 in place of the key slots 26. Each button slot 74 has a button engagement surface 76 on one side of the button slot 74 that extends into the open area of each button slot 74. The button slots 74 each accept the button 32 and post 34 combination extending from the device 10. The buttons 32 fit into a button entrance section 78 of each button slot 74. The button entrance 78 is large enough to allow the whole button 32 to pass through the mounting plate 22, when the device 10 is installed through the front of the device opening 18 of the trim ring 14, as shown in FIG. 8. As shown in FIG. 9, the device bracket 16 is moved along the stud slots 72 of the device bracket 16, so that each button engagement surface 76 engages a part of the bottom surface of the button 32. Engagement of the bottom surface of the buttons 32 prevents the device 10 from separating from the device bracket 16. The threaded nuts 52 are then tighten down to prevent movement of the device bracket 16 along the studs 20. FIGS. 7-9 also show a plunger 80 attached to the device bracket 16. The plunger 80 includes plunger rod 82, handle 84, spring 86 and plunger housing 88, as shown in FIGS. 10-11. The plunger housing 88 is attached to the device bracket 16 above a plunger hole 90 in the device bracket 16. The plunger hole 90 aligns with a plunger recess 92 in the device 10 when the device 10 is attached to the device mount 12. The plunger rod 82 includes a lock end 94, spring flange 96 and handle end 98. The handle 84 is part of the handle end 98. The spring 86 is mounted between the spring flange 96 and the inside top of the plunger housing 88. The spring 86 biases the lock end 94 downward through the plunger hole 90 of the device bracket 16. When the buttons 32 of the device 10 are inserted into the button slots 74, the plunger 80 can be pulled up by the handle 84 or the plunger 80 is pushed up by the bottom of the device 10, as shown in FIG. 10. When the device bracket 16 is moved along the trim ring 14 to secure the device 10, the spring 86 forces the lock end 94 of the plunger rod 82 into the plunger recess 92 of the device 10 when the plunger recess 92 and the lock end 94 align, either due to release of the handle 84 or the natural bias force of the spring 86 when the plunger 80 locates the plunger recess 92, as shown in FIG. 11. The plunger 80 prevents movement of the device bracket 16 along the trim ring 14 due to the restriction of moment of the device 10 in device opening 18 of the trim ring 14.

Figure 12:
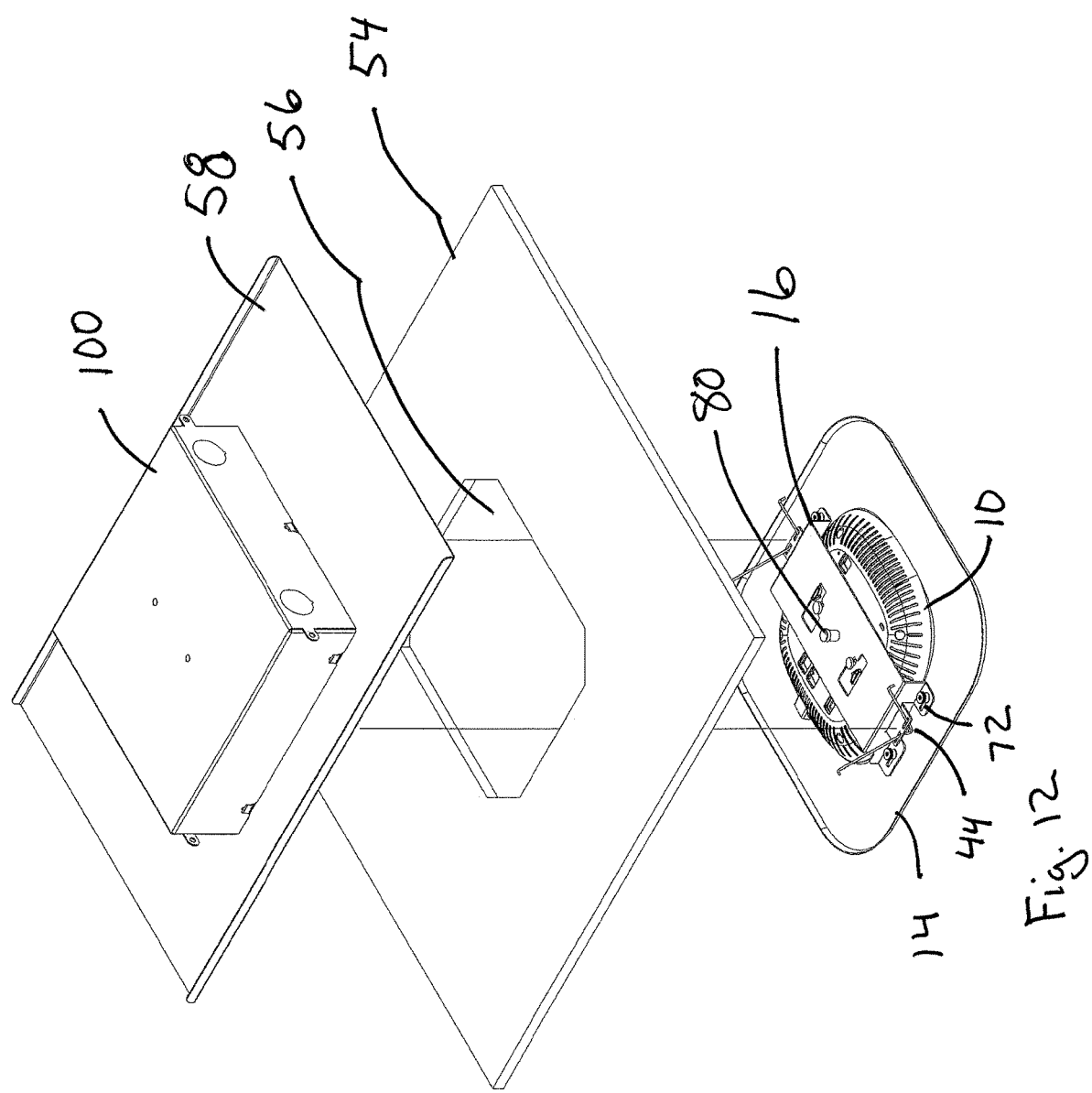
FIG. 12 is a perspective view of a device and device mount according to the present invention.
Figure 13:
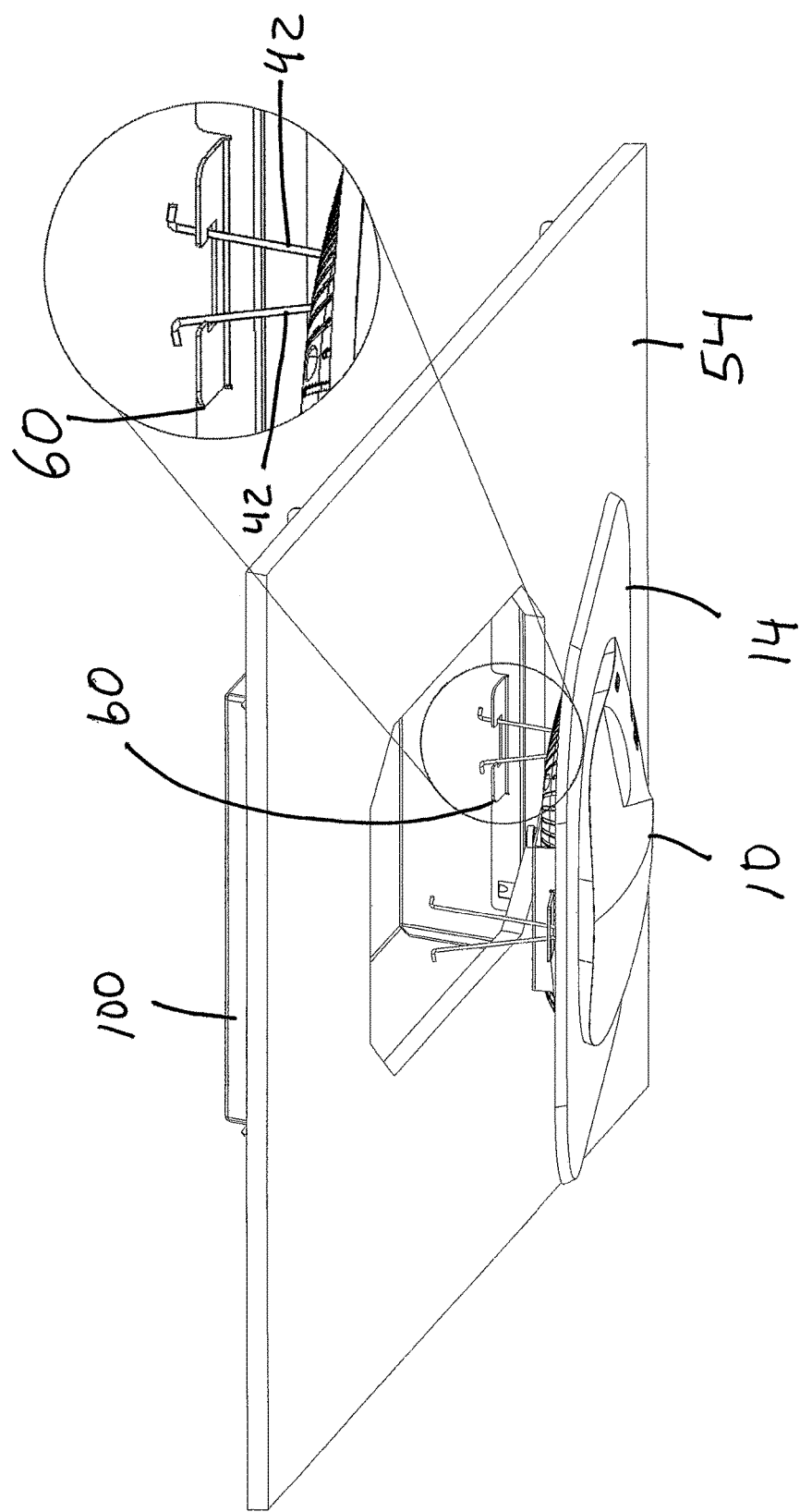
FIG. 13 is a perspective view of a device and device mount according to the present invention.
Figure 14:
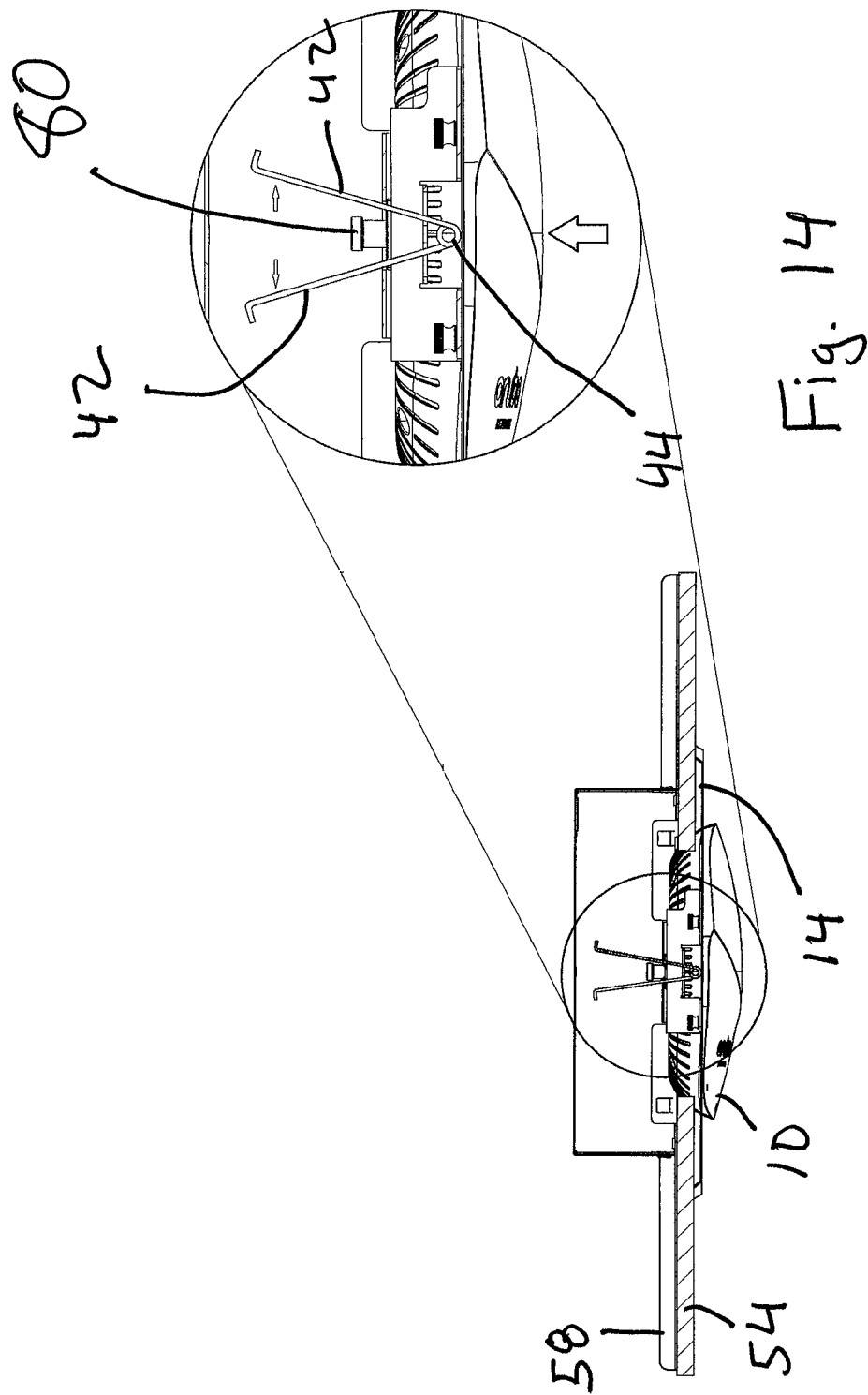
FIG. 14 is a sectional view a device, device mount, ceiling receiver according to the present invention.
Figure 15:
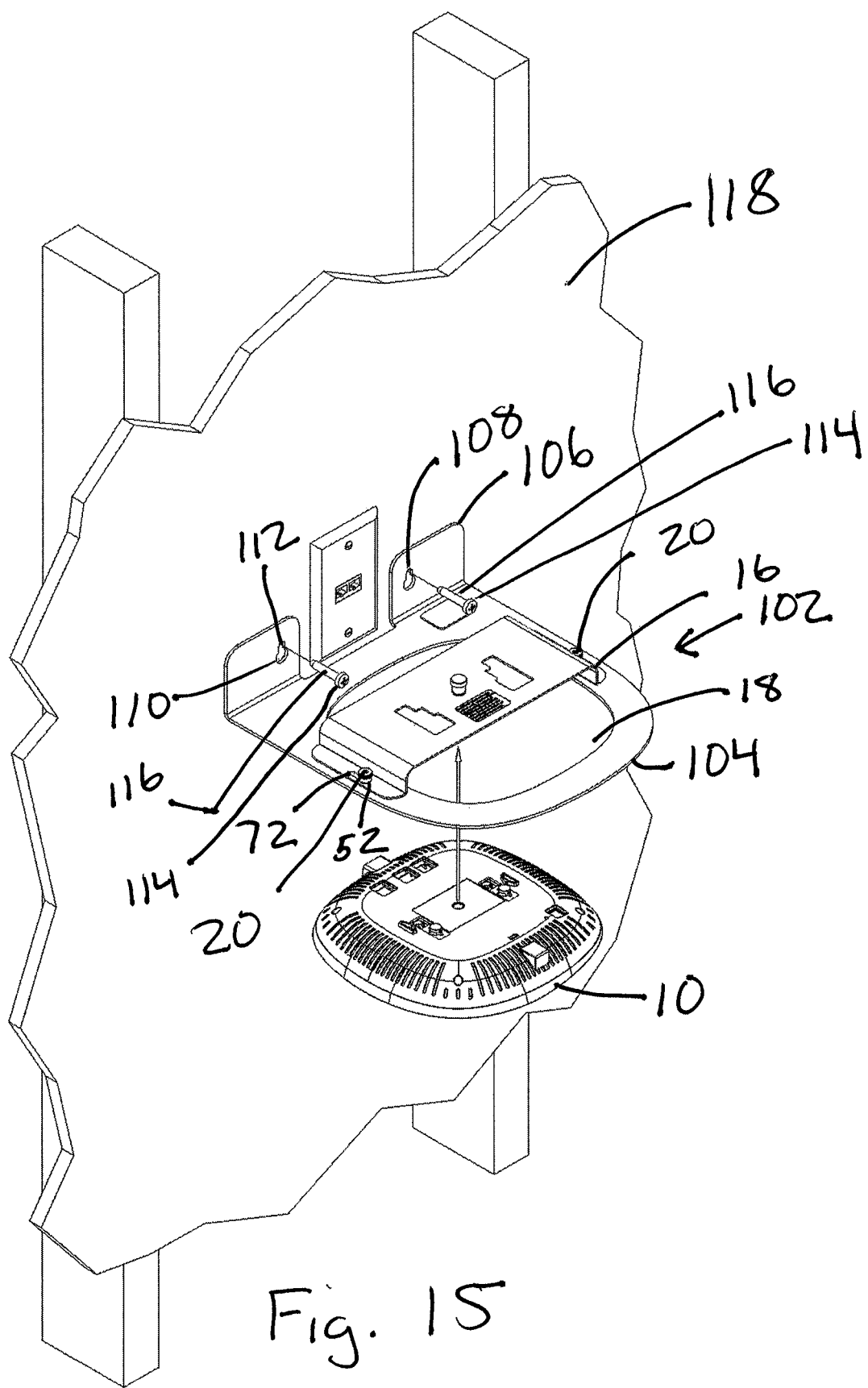
FIG. 15 is a perspective view of a device and device mount according to the present invention.
Figure 16:
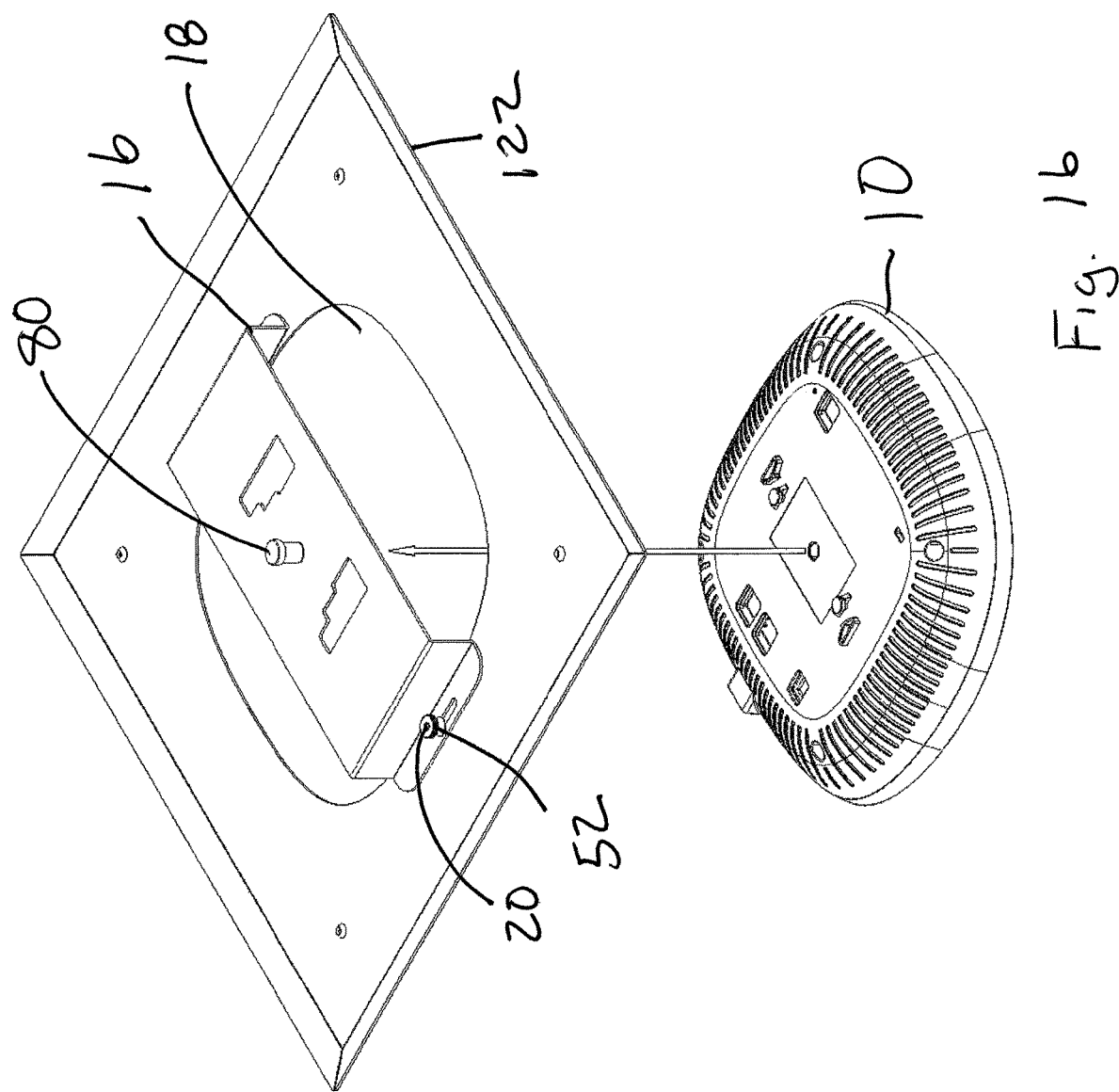
FIG. 16 is a perspective view of a device and device mount according to the present invention.
Figure 17:
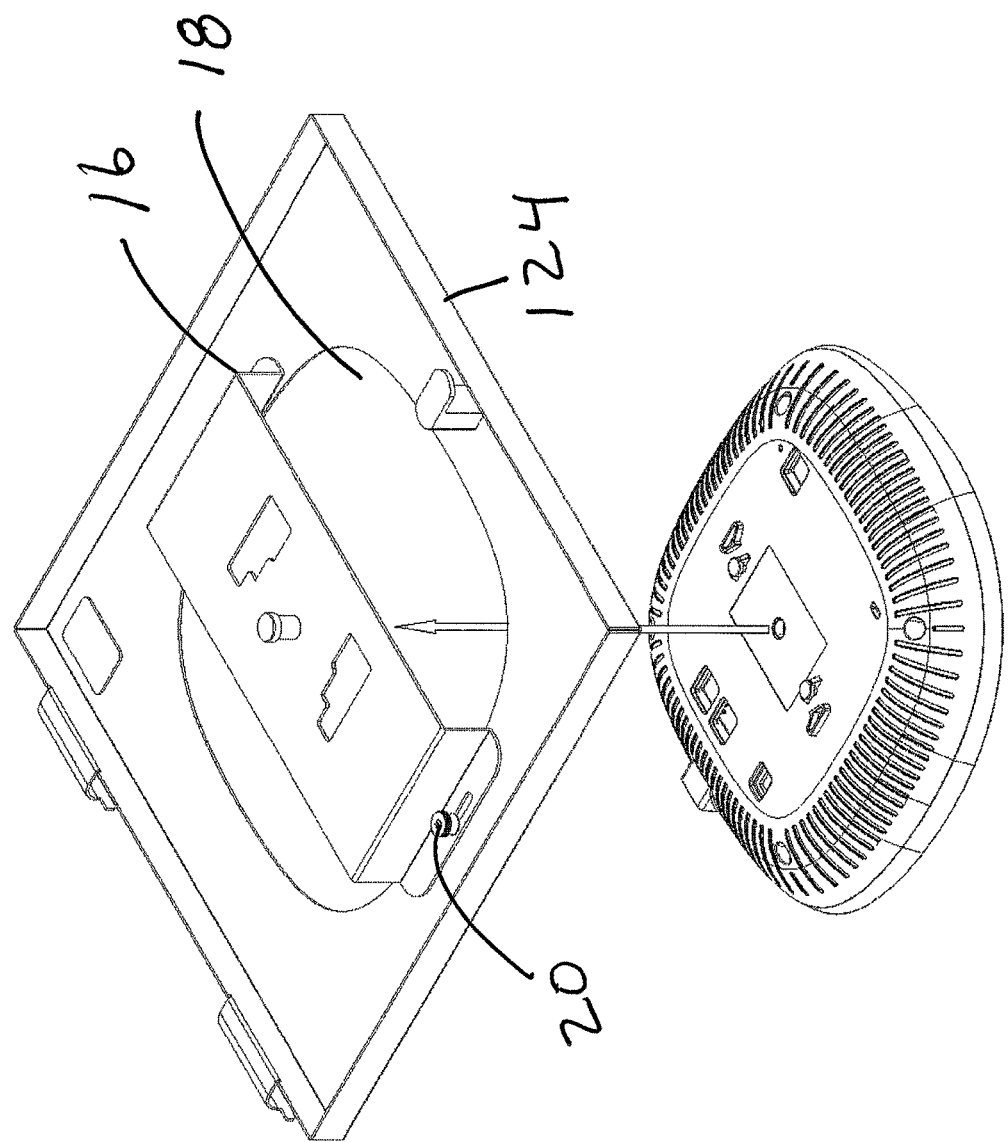
FIG. 17 is a perspective view of a device and device mount according to the present invention.

FIGS. 12-14 show the mounting of the device 10 using the device bracket 16 in the ceiling receiver that includes cover box 100 mounted to the device mount receiver. The device mount receiver includes two spring lock flanges 60 mounted inside the cover box 100, as shown in FIGS. 13-14. The spring lock flanges 60 are the same as the spring lock flanges 60 shown in FIGS. 4-6 and operate with the legs 42 of the spring 44 in the same as shown in FIGS. 4-6. FIGS. 15-17 show a device bracket 16 similar the device bracket 16 of FIGS. 7-11, but in different embodiments. The difference is that device bracket includes only one stud slot 72 on each side. The device bracket 16 still includes the plunger 80. FIG. 15 shows the device bracket 16 attached to a device receiver that acts as a housing assembly. The device receiver of FIG. 15 is a bracket 102 that includes a receiver plate 104 that acts as a housing and mounting flanges 106 extending from the receiver plate 104. The mounting flanges 106 each include a key slot 108 having a fastener opening 110 leading to a slot 112 in the mounting flange 106. The key slots 108 accept a fastener having a head 114 with a main body 116, typically a screw to be screwed into a wall 118. The fastener is attached to a structure like a wall 118, so that part of the main body 116 and head 114 extends from the structure. The head 114 fits into and beyond the fastener opening 110 that acts as a head entrance and each slot 110 of each mounting flange 106 slides along main body 116, so that the mounting flanges 106 hang from the fasteners. The fasteners are then tighten down to secure the device receiver 102 to the wall 118. The receiver plate 104 includes a device opening 18 and two threaded studs 20. The threaded studs 20 are shown with stud nuts 52 installed. It is envisioned that other fastener than threaded nuts can be employed, such as snap on fasteners or a fastener that captures the studs 20. The device bracket 16 is mounted to the back side of the receiver plate 104 using the studs 20 and stud nuts 52. The device 10 is installed in the device opening 18 to the device bracket 16 in the same manner as the device bracket 16 in FIGS. 7-11. FIG. 16 shows the device bracket 16 of FIG. 15 used with a bezel 122 that is mountable to fill an opening in a wall or ceiling, where the bezel 122 includes a device opening 18. In FIG. 16, the device bracket 16 is mounted to studs 20 on the backside of the ceiling tile 122. FIG. 17 shows the device bracket 16 of FIG. 15 used with a lockable door 124 with a device opening 18 that is mountable to a ceiling system or secure box. In FIG. 17, the device bracket is mounted to studs 20 on the backside of the door 124 with threaded nuts 52.

Figure 18:
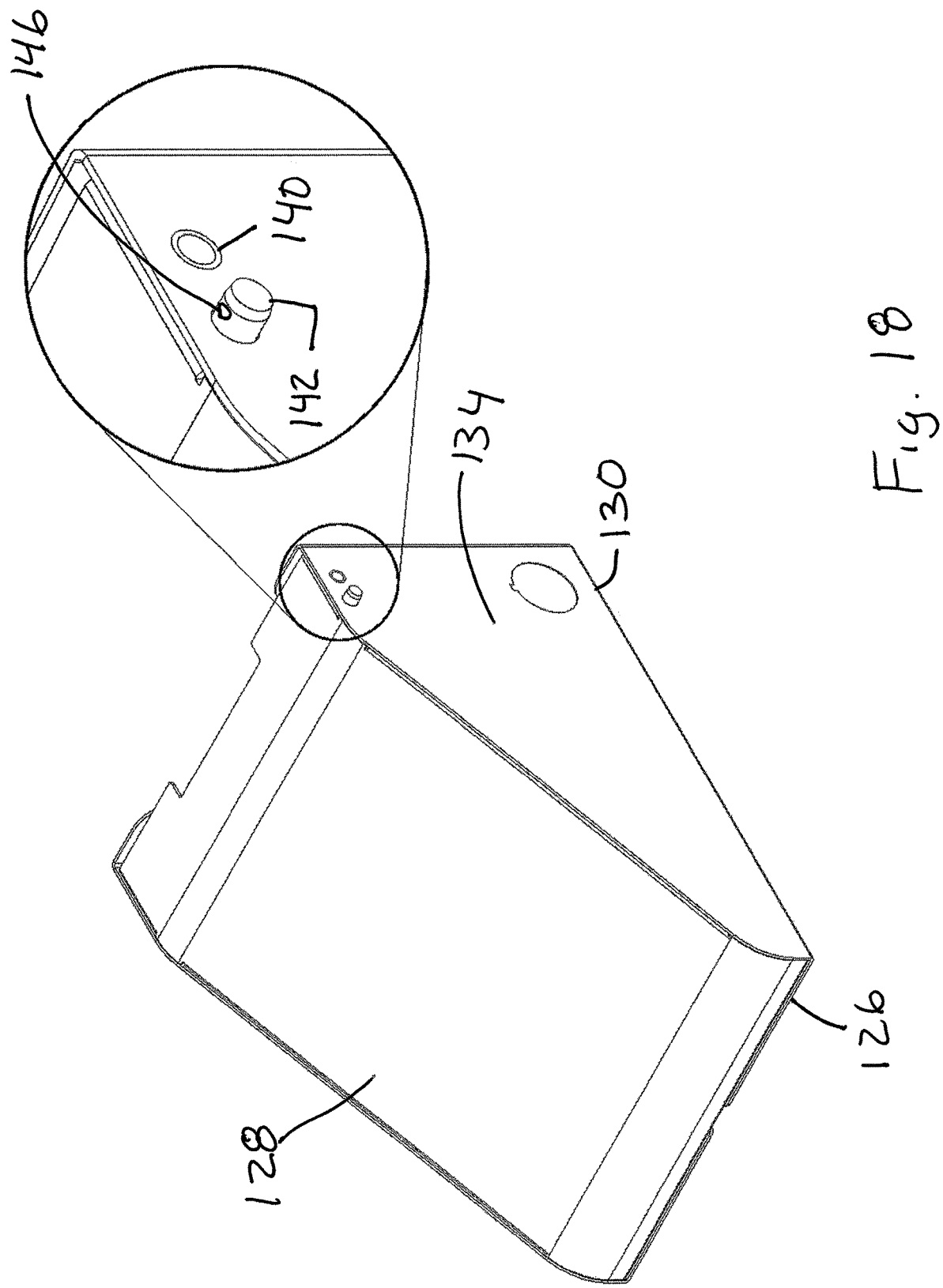
FIG. 18 is a perspective view of a ceiling receiver according to the present invention.
Figure 19:
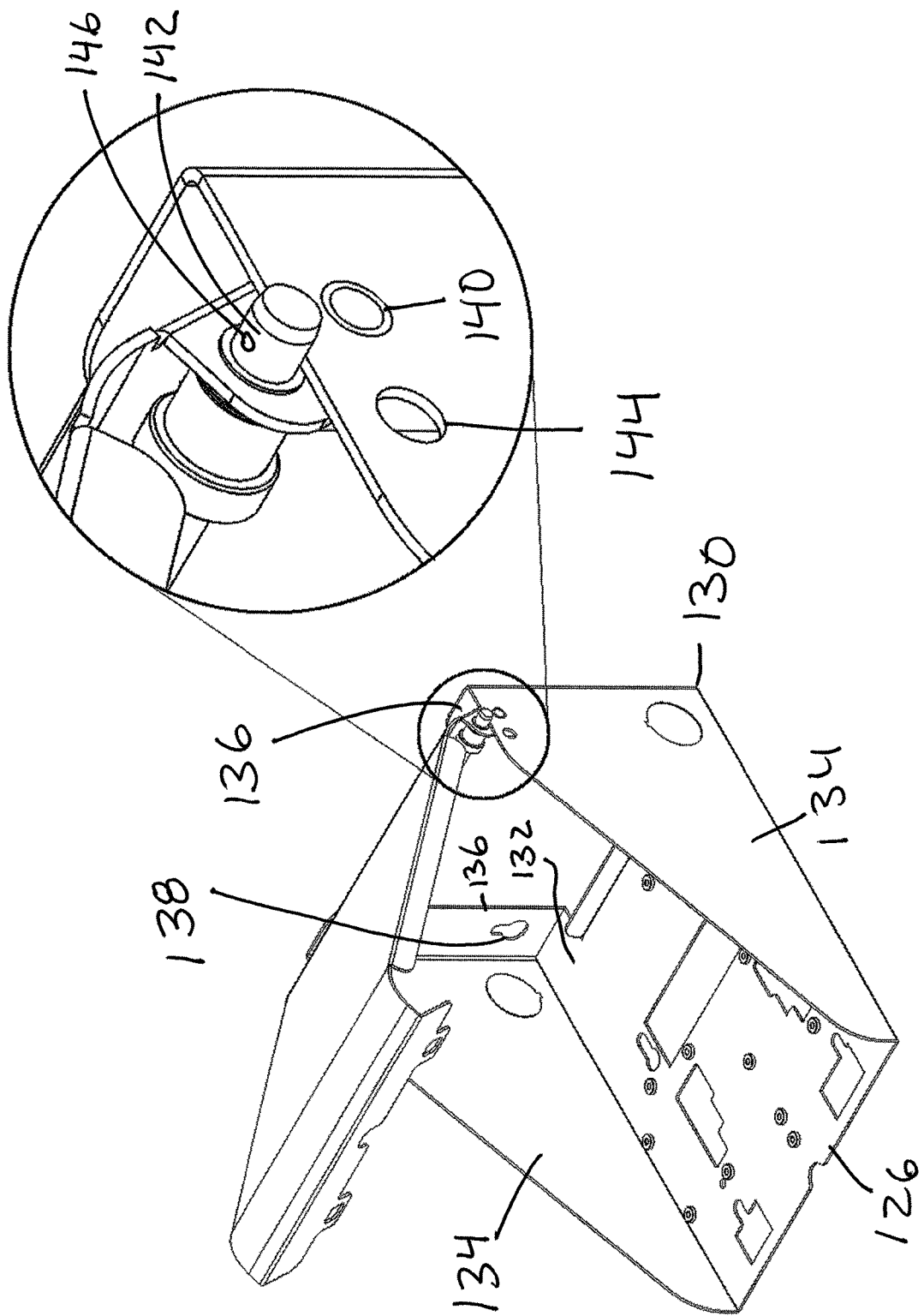
FIG. 19 is a perspective view of a ceiling receiver according to the present invention.
Figure 20:
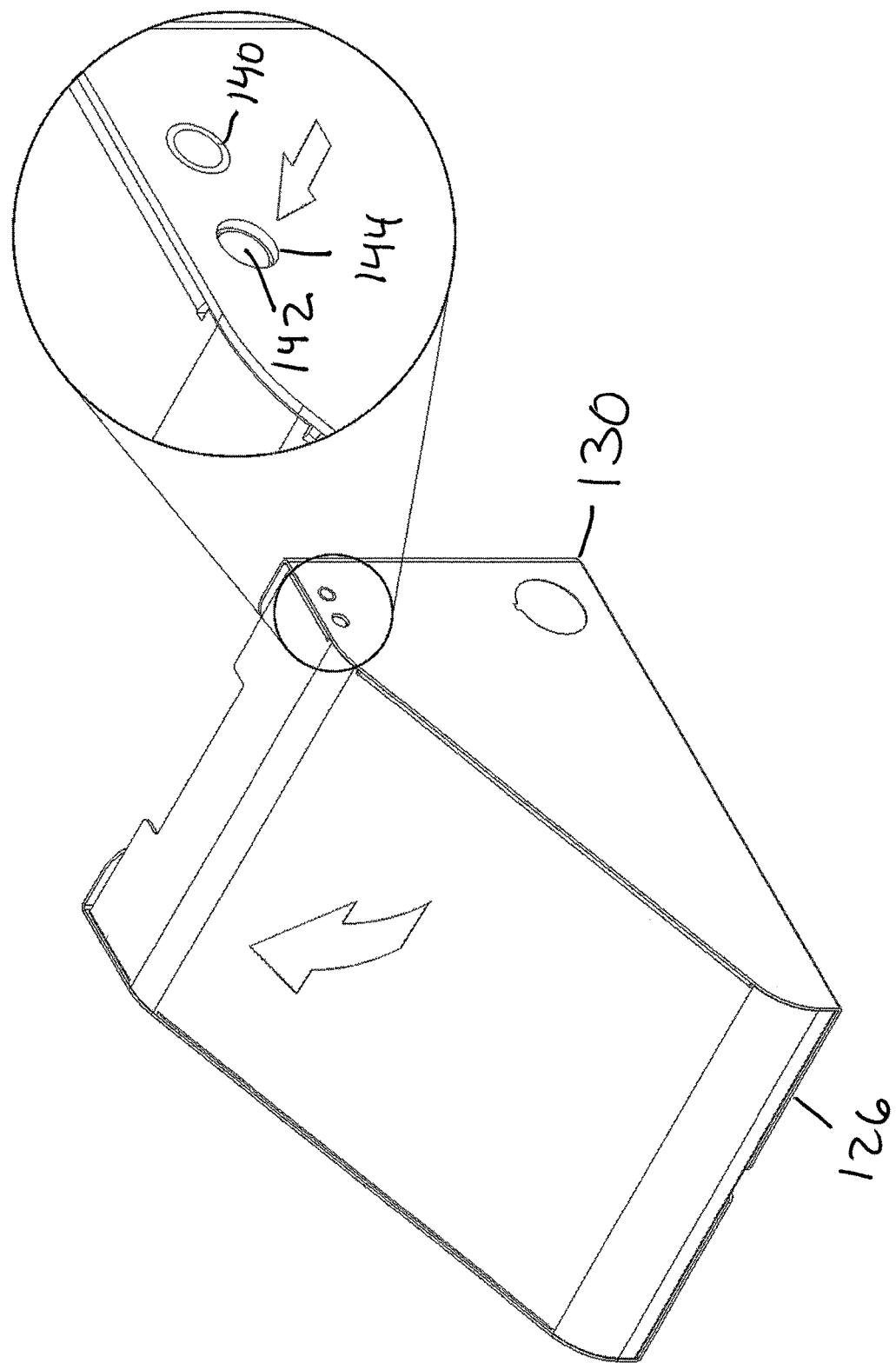
FIG. 20 is a perspective view of a device mount and ceiling receiver according to the present invention.
Figure 21:
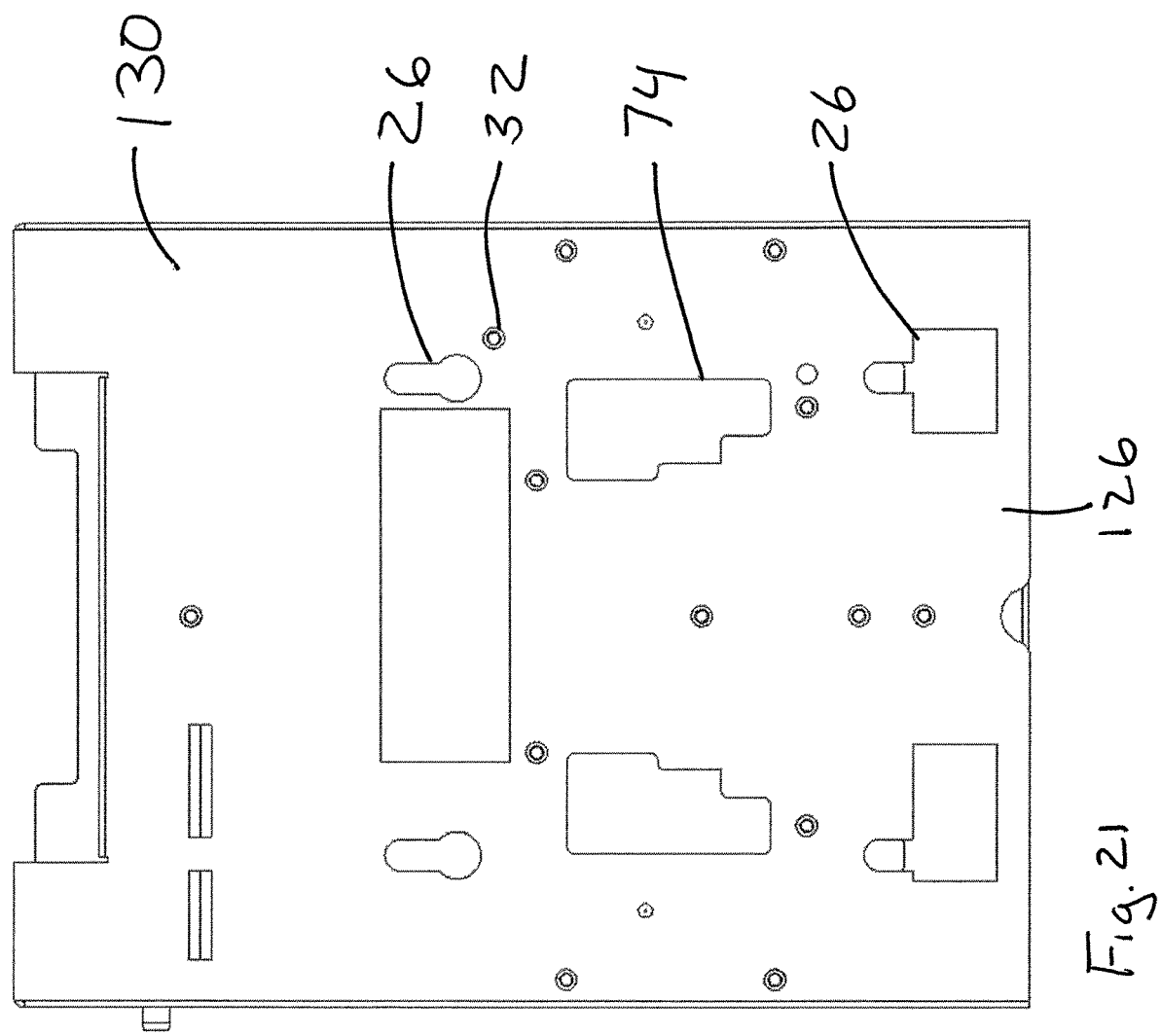
FIG. 21 is a bottom view of a device mount according to the present invention.
Figure 22:
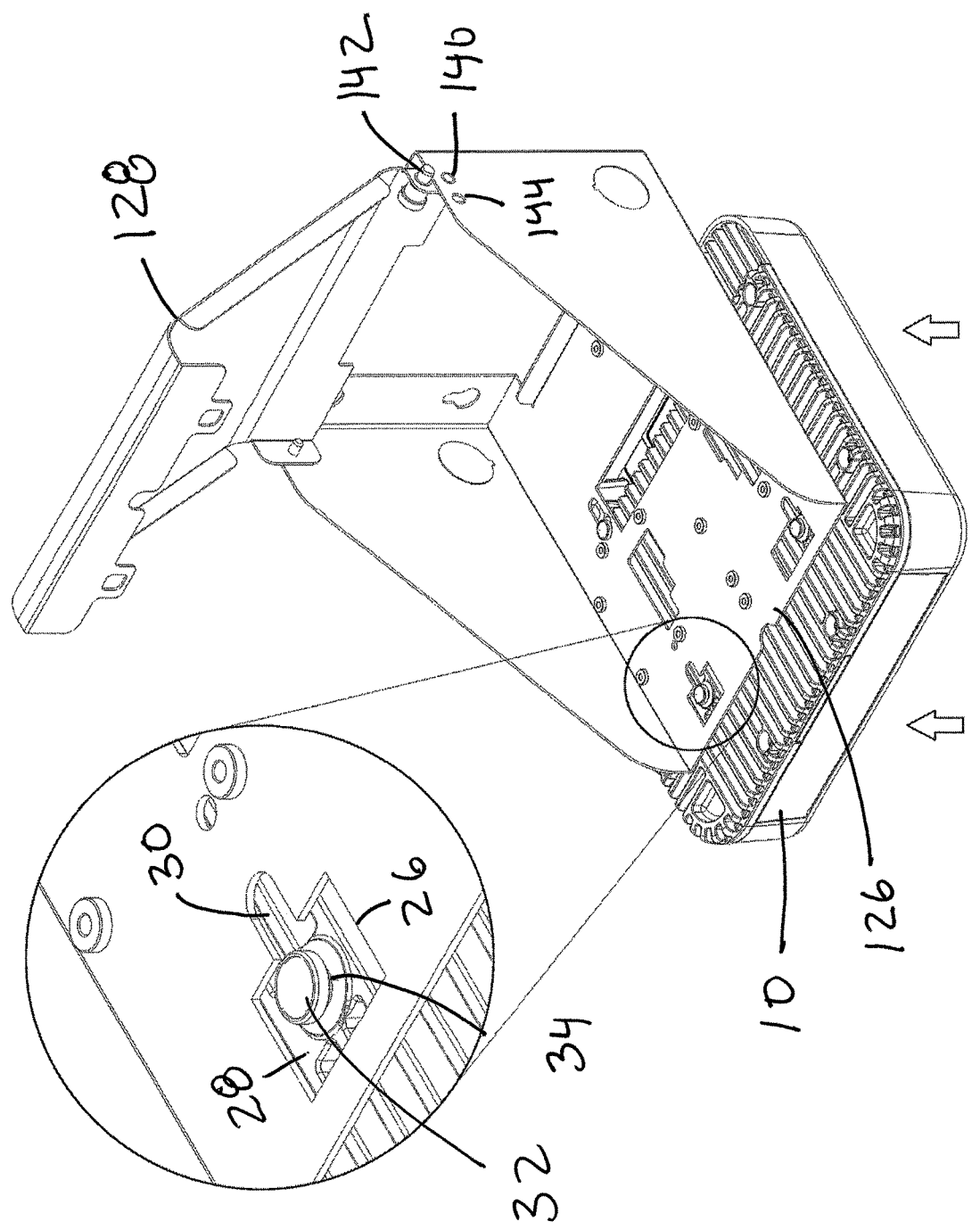
FIG. 22 is a sectional view of a device, device mount and ceiling receiver according to the present invention.
Figure 23:
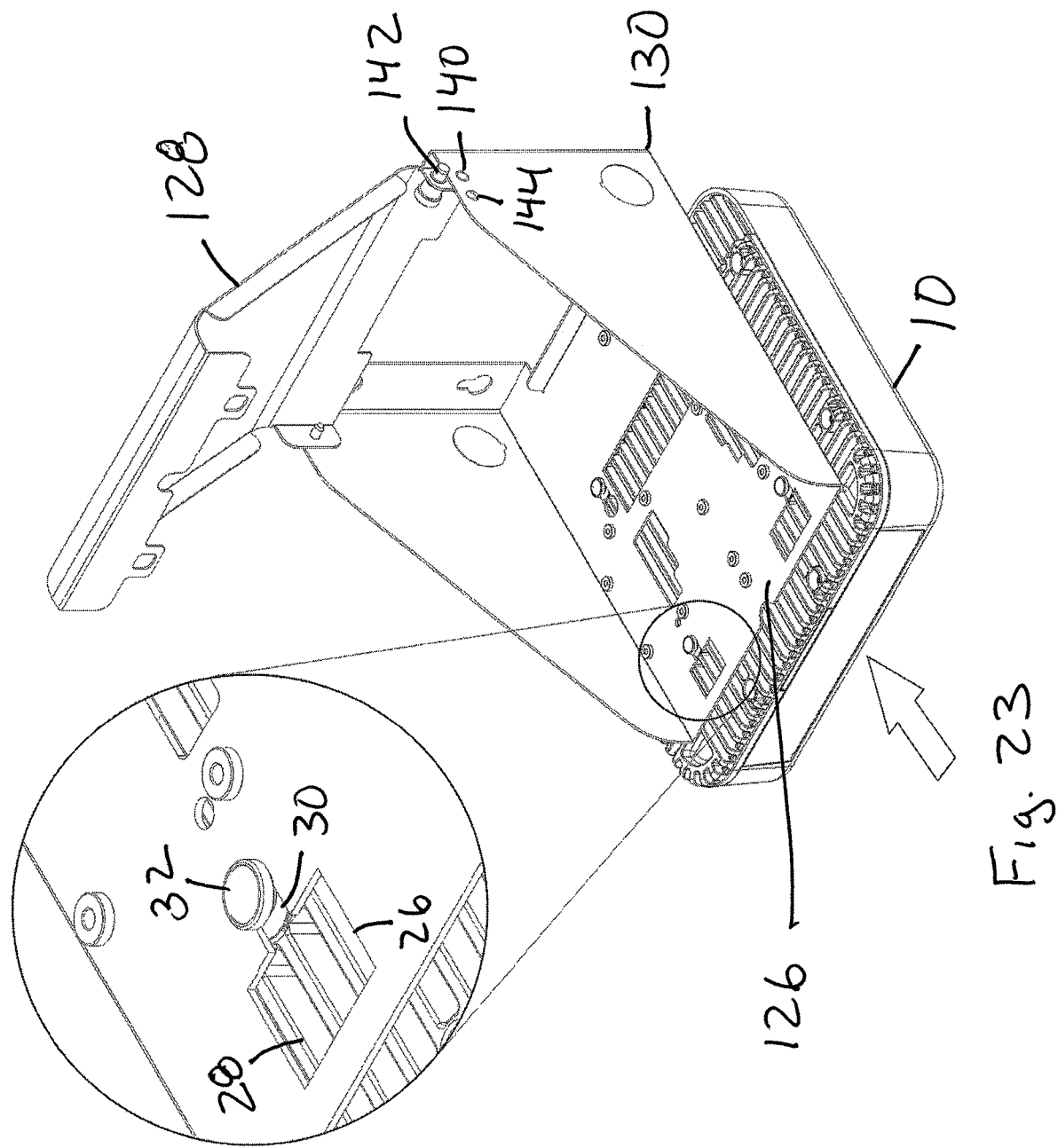
FIG. 23 is a sectional view of a device, device mount and ceiling receiver according to the present invention.

FIGS. 18-23, show a device receiver with a built in device bracket 126 without support flanges. The device receiver includes a lid 128 and a main body 130 that together forms an enclosure, as shown in FIGS. 18-20. The main body 130 includes a bottom 132, two sides 134 and rear flanges 136. The rear flanges 136 include key holes 138 to receive fasteners in the same manner as the device receiver of FIG. 15. The key holes 138 are placed over the fasteners extending from a wall and the main body 130 slides down along the slots until the main body 130 hangs on the wall. The fasteners are then tighten down to secure the main body 130 to the wall. The wall acts as a side of the main body 130 to form the enclosure, when the device receiver is mounted to a wall 118. The lid 128 is rotatably mounted with hinges 140 to each of the sides 134, so that the lid 128 can be rotated up and down to open and close the lid 128. FIGS. 18-20 show a lid lock near one of the hinges 140. The lid lock is a spring loaded plunger 142 attached to the lid 128. The side 134 that uses the lid lock includes a plunger hole 144 to capture the plunger 142. The plunger 142 is pushed inward as indicated by the arrow to unlock the lid 128 and allow the lid 128 to be rotated. The plunger 142 is to be depressed as the lid 128 is closed, until the plunger 142 engages the plunger hole 144 to secure the lid 128 in place. A lock hole 146 in the plunger 142 provides for the insertion of a lock to prevent movement of the plunger 142 for increased security. The bottom 132 of the main body 130 is a plate that functions as the device bracket 126 to hold the device 10, as shown in FIGS. 20-23. FIG. 21 shows an outside view of the bottom 132. The device bracket 126 includes the key holes 26 and mounting holes 36 similar to the device bracket 16 of FIGS. 1-3. The device bracket 126 also includes two button slots 74 similar to the device bracket 16 of FIGS. 7-11. FIGS. 22-23 show mounting of the device 10 using the key slots 26 in a similar manner to mounting the device 10 in FIG. 2.

While different embodiments of the invention have been described in detail herein, it will be appreciated by those skilled in the art that various modifications and alternatives to the embodiments could be developed in light of the overall teachings of the disclosure. Accordingly, the particular arrangements are illustrative only and are not limiting as to the scope of the invention that is to be given the full breadth of any and all equivalents thereof. This includes mix and matching of the disclosed versions of the device bracket and the device receiver.

The invention claimed is:

1. A device mounting system for wireless and sensing devices, comprising:
    a device bracket adapted to receive a device by attachment of the device to said device receiver bracket;
    a housing assembly to receive and support said device receiver bracket;
    a mounting interface to act as an interface to attach said device bracket to said housing assembly; and
    wherein said mounting interface includes at least two springs, each of said springs including a coil and two spring legs extending from said coil, each of said spring legs including a spring stop; wherein said mounting interface includes at least two spring flanges, each of said spring flanges mounted to support said device bracket to said housing assembly by said at least two springs, each of said spring flanges including two spring slots to each receive one of said spring legs, said two spring slots positioned to keep said spring legs of each of said springs in a state of compression; wherein said mounting interface includes a spring lock flange as part of said housing assembly for each of said springs, each of said spring lock flange includes a spring lock slot to receive said spring legs of one of said springs, whereby each of said spring stop of said spring leg engages said spring lock flange to prevent said device bracket from falling from said housing assembly.

2. The device mounting system of claim 1, wherein each of said spring flanges are mounted directly to said device receiver bracket.

3. The device mounting system of claim 1, wherein each of said spring lock flanges include an entrance opening to allow said spring legs to pass.

4. The device mounting system of claim 1, wherein said mounting interface includes a device mount receiver, said device mount receiver including a base with said spring lock flanges mounted to said base, said base including a device opening to receive said device receiver bracket; and wherein said base is adapted to mount over a ceiling opening in a ceiling so said device opening aligns with the ceiling opening, and said spring lock flanges are located on said base near said device opening.

5. The device mounting system of claim 4, wherein said base is wider than the ceiling opening so said base lies against an inside surface of the ceiling to provide support and improved weight distribution about the ceiling opening.

6. The device mounting system of claim 1, wherein said mounting interface includes a device mount receiver, said device mount receiver including a base and a cover box, said base including a device opening to receive said device receiver bracket; wherein said base is adapted to mount over a ceiling opening in a ceiling so said device opening aligns with the ceiling opening; wherein said cover box is attached above said device opening to provide an enclosure about said device opening, and said spring lock flanges are mounted to said cover box near said device opening.

7. A device mounting system for wireless and sensing devices, comprising:
   a device bracket adapted to receive a device by attachment of the device to said device receiver bracket;
   a housing assembly to receive and support said device receiver bracket;
   a mounting interface to act as an interface to attach said device bracket to said housing assembly; and
   wherein said device bracket includes a mounting plate with two support flanges, said mounting plate including key slots adapted to accept a button and post combination extending from the device, said key slots having a fastener opening leading to a slot, said fastener opening adapted to receive the button beyond said mounting plate to allow the posts slide along said slot to secure the device to the device receiver bracket, where the button prevents the device from separating from the device bracket when the post is moved along said slot and away from said fastener opening.

8. The device mounting system of claim 7, wherein said mounting interface includes at least two springs, each of said springs including a coil and two spring legs extending from said coil, each of said spring legs including a spring stop; wherein said mounting interface includes at least two spring flanges mounted to said device receiver bracket, each of said spring flanges mounted to support said device bracket to housing assembly by said at least two springs, each of said spring flanges including two spring slots to each receive one of said spring legs, said two spring slots positioned to keep said spring legs of each of said springs in a state of compression; wherein said mounting interface includes a spring lock flange as part of said housing assembly for each of said springs, each of said spring lock flange includes a spring lock slot to receive said spring legs of one of said springs, whereby each of said spring stop of said spring leg engages said spring lock flange to prevent said device bracket from falling from said housing assembly.

9. The device mounting system of claim 8, wherein said device bracket includes a trim flange extending from each of said support flanges and wherein said mounting interface includes a trim ring mounted to said trim flanges.

10. A device mounting system for wireless and sensing devices, comprising:
    a device bracket adapted to receive a device by attachment of the device to said device receiver bracket;
    a housing assembly to receive and support said device receiver bracket;
    a mounting interface to act as an interface to attach said device bracket to said housing assembly; and
    wherein said device bracket includes a mounting plate with two support flanges, said mounting plate including two button slots in the mounting plate, each of said button slots has a button engagement surface on one side of said button slot that extends into an open area of each button slot and a button entrance section, said button slots are each adapted to accept a button and post combination extending from the device, where the buttons fit into said button entrance section of each of said button slots, said button entrance section is large enough to allow the button to pass through said mounting plate, each of said button engagement surface engages a part of the button when said device bracket is move along the device, where such engagement prevents the device from separating from said device receiver bracket; and wherein said mounting plate of said device bracket includes a plunger assembly, said plunger including plunger rod, spring and plunger housing, said plunger housing attached to said device bracket above a plunger hole in said device bracket to hold said plunger assembly, said plunger hole is adapted to align with a plunger recess in the device, where said spring biases said plunger rod toward said plunger hole to engage the plunger recess and lock the device in said device bracket when said button engagement surfaces engage the buttons.

11. The device mounting system of claim 10, wherein said mounting interface includes at least two springs, each of said springs including a coil and two spring legs extending from said coil, each of said spring legs including a spring stop; wherein said mounting interface includes at least two spring flanges mounted to said device receiver bracket, each of said spring flanges mounted to support said device bracket to said housing assembly by said at least two springs, each of said spring flanges including two spring slots to each receive one of said spring legs, said two spring slots positioned to keep said spring legs of each of said springs in a state of compression; wherein said install system includes a spring lock flange as part of said housing assembly for each of said springs, each of said spring lock flange includes a spring lock slot to receive said spring legs of one of said springs, whereby each of said spring stop of said spring leg engages said spring lock flange to prevent said device bracket from falling from said housing assembly.

12. The device mounting system of claim 11, wherein said device bracket includes a trim flange extending from each of said support flanges; and wherein said install system includes a trim ring mounted to said trim flanges, said trim flanges including stud slots to receive studs said trim ring.

13. The device mounting system of claim 10, wherein said housing assembly is a bracket that includes a receiver plate and mounting flanges extending from said receiver plate, and said device bracket is mounted to said receiver plate of said housing assembly.

14. The device mounting system of claim 10, wherein said housing assembly is a tile and said device bracket is mounted to said tile of said housing assembly.

15. The device mounting system of claim 10, wherein said housing assembly is a door and said device bracket is mounted to said door of said housing assembly.

16. The device mounting system of claim 7, wherein said housing assembly includes a lid and a main body that together forms an enclosure about said device receiver bracket, said main body includes a bottom, two sides and rear flanges, said rear flanges are adapted for attachment of said housing assembly to a surface so that the surface acts as an additional side of said main body to form said enclosure, said bottom is formed by said mounting plate of said device receiver without said support flanges, said lid is rotatably mounted to each of said sides, so that said lid can be rotated up and down to open and close said lid.

17. The device mounting system of claim 16, wherein said lid includes a lid lock near one of said hinges, said lid lock is a spring loaded lid plunger attached to said lid and a plunger hole on one of said sides to capture said lid plunger, said lid plunger is biased towards said plunger hole.

18. The device mounting system of claim 10, wherein said housing assembly includes a lid and a main body that together forms an enclosure about said device receiver bracket, said main body includes a bottom, two sides and rear flanges, said rear flanges are adapted for attachment of said housing assembly to a surface so that the surface acts as an additional side of said main body to form said enclosure, said bottom is formed by said mounting plate of said device receiver without said support flanges, said lid is rotatably mounted to each of said sides, so that said lid can be rotated up and down to open and close said lid.

19. The device mounting system of claim 18, wherein said lid includes a lid lock near one of said hinges, said lid lock is a spring loaded lid plunger attached to said lid and a plunger hole on one of said sides to capture said lid plunger, said lid plunger is biased towards said plunger hole.

* * * * *